(12) United States Patent
Nasir et al.

(10) Patent No.: US 11,421,595 B2
(45) Date of Patent: Aug. 23, 2022

(54) SCAVENGE METHODOLOGIES FOR TURBINE ENGINE PARTICLE SEPARATION CONCEPTS

(71) Applicant: HONEYWELL INTERNATIONAL INC., Morris Plains, NJ (US)

(72) Inventors: Shakeel Nasir, Torrance, CA (US); Yogendra Yogi Sheoran, Scottsdale, AZ (US); John Schugardt, Chandler, AZ (US); Daniel Aukland, Phoenix, AZ (US); Mahmoud Mansour, Phoenix, AZ (US); Cristopher Frost, Scottsdale, AZ (US); Matt Greenman, Phoenix, AZ (US)

(73) Assignee: HONEYWELL INTERNATIONAL INC., Charlotte, NC (US)

( * ) Notice: Subject to any disclaimer, the term of this patent is extended or adjusted under 35 U.S.C. 154(b) by 159 days.

(21) Appl. No.: 16/656,262

(22) Filed: Oct. 17, 2019

(65) Prior Publication Data

US 2020/0049069 A1 Feb. 13, 2020

Related U.S. Application Data

(62) Division of application No. 15/352,839, filed on Nov. 16, 2016, now abandoned.

(51) Int. Cl.
*F02C 7/052* (2006.01)
*F02C 3/04* (2006.01)

(52) U.S. Cl.
CPC ............... *F02C 7/052* (2013.01); *F02C 3/04* (2013.01); *F05D 2260/607* (2013.01)

(58) Field of Classification Search
CPC .... F02C 7/05; F02C 7/052; F02C 3/05; F02C 3/08; F02C 3/09; F02C 7/055;
(Continued)

(56) References Cited

U.S. PATENT DOCUMENTS 2,709,893 A 6/1955 Birmann
3,362,629 A 1/1968 Papapanu
(Continued)

FOREIGN PATENT DOCUMENTS

EP  1874626 A2   1/2008
JP  2002242699 A  8/2002
JP  2002242699 A * 8/2002

OTHER PUBLICATIONS

Extended EP Search Report for Application No. 17200875.7 dated Apr. 5, 2018.
(Continued)

*Primary Examiner* — Stephanie Sebasco Cheng
(74) *Attorney, Agent, or Firm* — Lorenz & Kopf, LLP

(57) ABSTRACT

A method for scavenging small particles from a turbine engine includes directing compressed air through a flowpath, downstream of a compressor, which causes a reduction in a radial flow component and the introduction of or an increase in an axial flow component of the compressed air, removing a portion of the compressed air from the flowpath and directing the portion into a scavenge plenum, the scavenge plenum being positioned adjacent to and radially outward from the flowpath, and returning the portion of the compressed air from the plenum to the flowpath while maintaining a majority of the small particles that were present in the portion within the scavenge plenum. Further, the method includes removing the majority of small particles from the plenum. The step of removing occurs intermittently during engine operation, during engine shutdown, or while the engine is not in operation, but does not occur continuously during engine operation.

13 Claims, 20 Drawing Sheets

(58) Field of Classification Search
CPC ...... F05D 2260/607; B01D 2259/4575; B01D 45/08; B01D 45/10; B64D 2033/0246; B64D 2033/022; F01D 5/04; F01D 5/043; F04D 17/08; F04D 29/70; F05B 2260/60
See application file for complete search history.

(56) References Cited

U.S. PATENT DOCUMENTS

| | | | |
|---|---|---|---|
| 3,832,086 A | | 8/1974 | Hull, Jr. et al. |
| 3,993,463 A | | 11/1976 | Barr |
| 4,292,050 A | | 9/1981 | Linhardt et al. |
| 4,463,552 A | | 8/1984 | Monhardt et al. |
| 4,685,942 A | | 8/1987 | Klassen et al. |
| 5,123,240 A | | 6/1992 | Frost et al. |
| 5,857,833 A | * | 1/1999 | Dev .......... F02C 3/05 415/121.2 |
| 6,499,285 B1 | | 12/2002 | Snyder |
| 7,137,777 B2 | | 11/2006 | Fried et al. |
| 7,374,593 B2 | | 5/2008 | Snyder |
| 7,569,094 B2 | | 8/2009 | Kane et al. |
| 7,581,397 B2 | * | 9/2009 | Strangman .......... F04D 29/441 415/121.2 |
| 7,658,061 B2 | | 2/2010 | Kawamoto et al. |
| 7,678,165 B2 | | 3/2010 | Tingle et al. |
| 7,802,433 B2 | | 9/2010 | Higgins |
| 7,874,158 B2 | | 1/2011 | O'Neill et al. |
| 7,927,408 B2 | | 4/2011 | Sheoran et al. |
| 7,967,554 B2 | | 6/2011 | Bremer |
| 8,092,145 B2 | * | 1/2012 | Martel .......... F02C 7/052 415/1 |
| 8,256,277 B2 | | 9/2012 | Khibnik et al. |
| 8,512,450 B2 | | 8/2013 | Kazlauskas et al. |
| 8,539,775 B1 | | 9/2013 | Wong |
| 8,679,210 B2 | | 3/2014 | McAuliffe et al. |
| 8,943,791 B2 | | 2/2015 | Tibbott et al. |
| 9,027,202 B2 | | 5/2015 | Huang |
| 9,046,056 B2 | | 6/2015 | Lerg |
| 9,314,723 B2 | | 4/2016 | Judd et al. |
| 9,650,916 B2 | | 5/2017 | Barton |
| 9,982,599 B2 | | 5/2018 | Suciu |
| 10,724,436 B2 | * | 7/2020 | Mayer .......... B01D 45/08 |
| 2004/0096316 A1 | | 5/2004 | Simon |
| 2007/0144139 A1 | | 6/2007 | Kawamoto et al. |
| 2007/0183890 A1 | | 8/2007 | Nolcheff et al. |
| 2007/0235373 A1 | | 10/2007 | Strangman et al. |
| 2008/0152500 A1 | | 6/2008 | Mehring |
| 2008/0310951 A1 | | 12/2008 | Bremer |
| 2009/0145101 A1 | | 6/2009 | Suciu |
| 2012/0131900 A1 | | 5/2012 | Kenyon et al. |
| 2014/0290254 A1 | | 10/2014 | Manning et al. |
| 2015/0354461 A1 | | 12/2015 | Meier et al. |
| 2015/0377074 A1 | | 12/2015 | de Diego et al. |
| 2016/0115916 A1 | | 4/2016 | Kinsey, Jr. et al. |
| 2016/0123154 A1 | | 5/2016 | Manning et al. |
| 2016/0123227 A1 | | 5/2016 | Murray et al. |
| 2016/0186601 A1 | | 6/2016 | Manning et al. |
| 2017/0082025 A1 | * | 3/2017 | Ahmadian .......... B01D 45/14 |
| 2017/0284226 A1 | | 10/2017 | Nasir et al. |

OTHER PUBLICATIONS

Extended EP Search Report for Application No. 17157027.8-1607 dated Aug. 25, 2017.

* cited by examiner

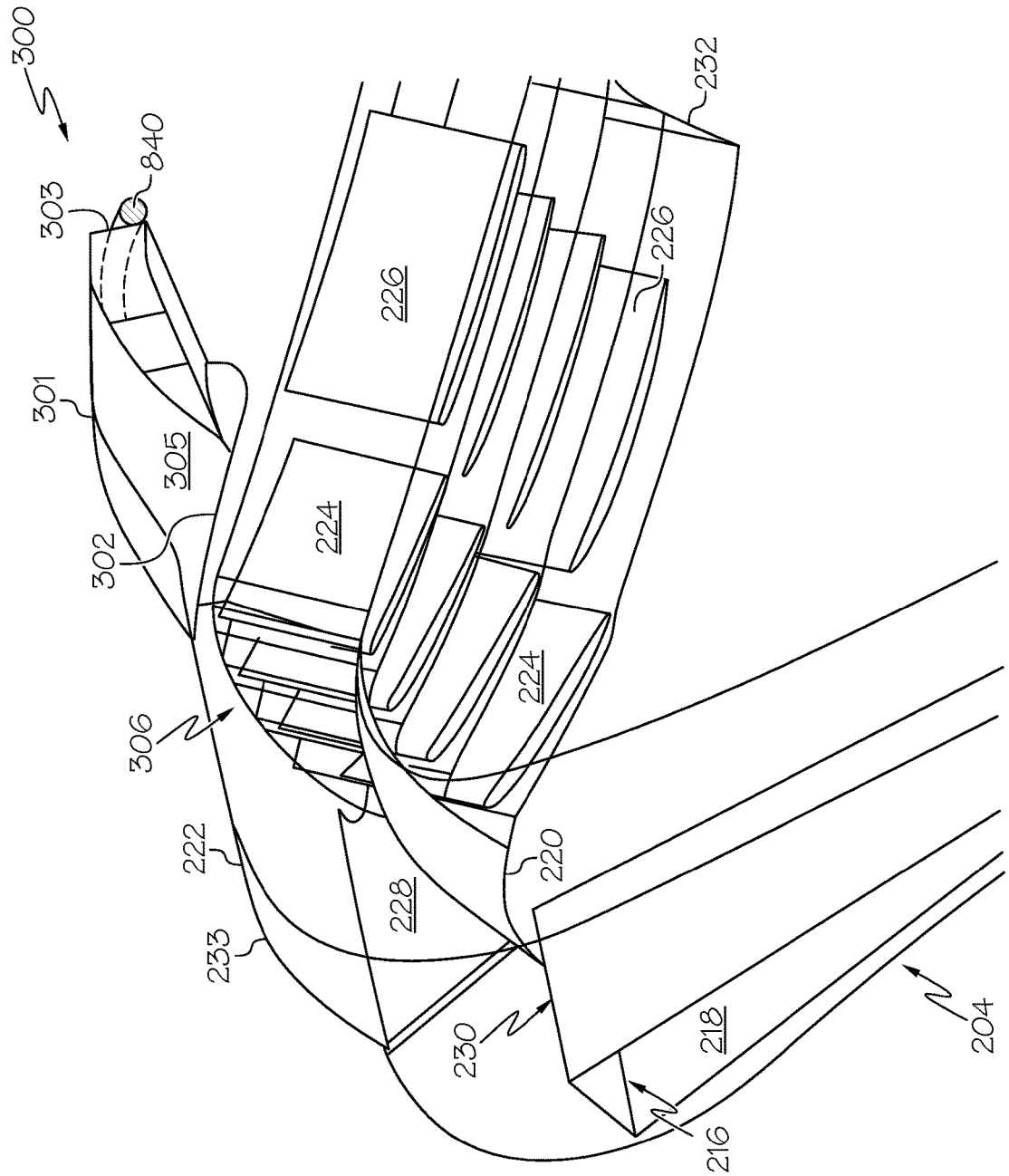

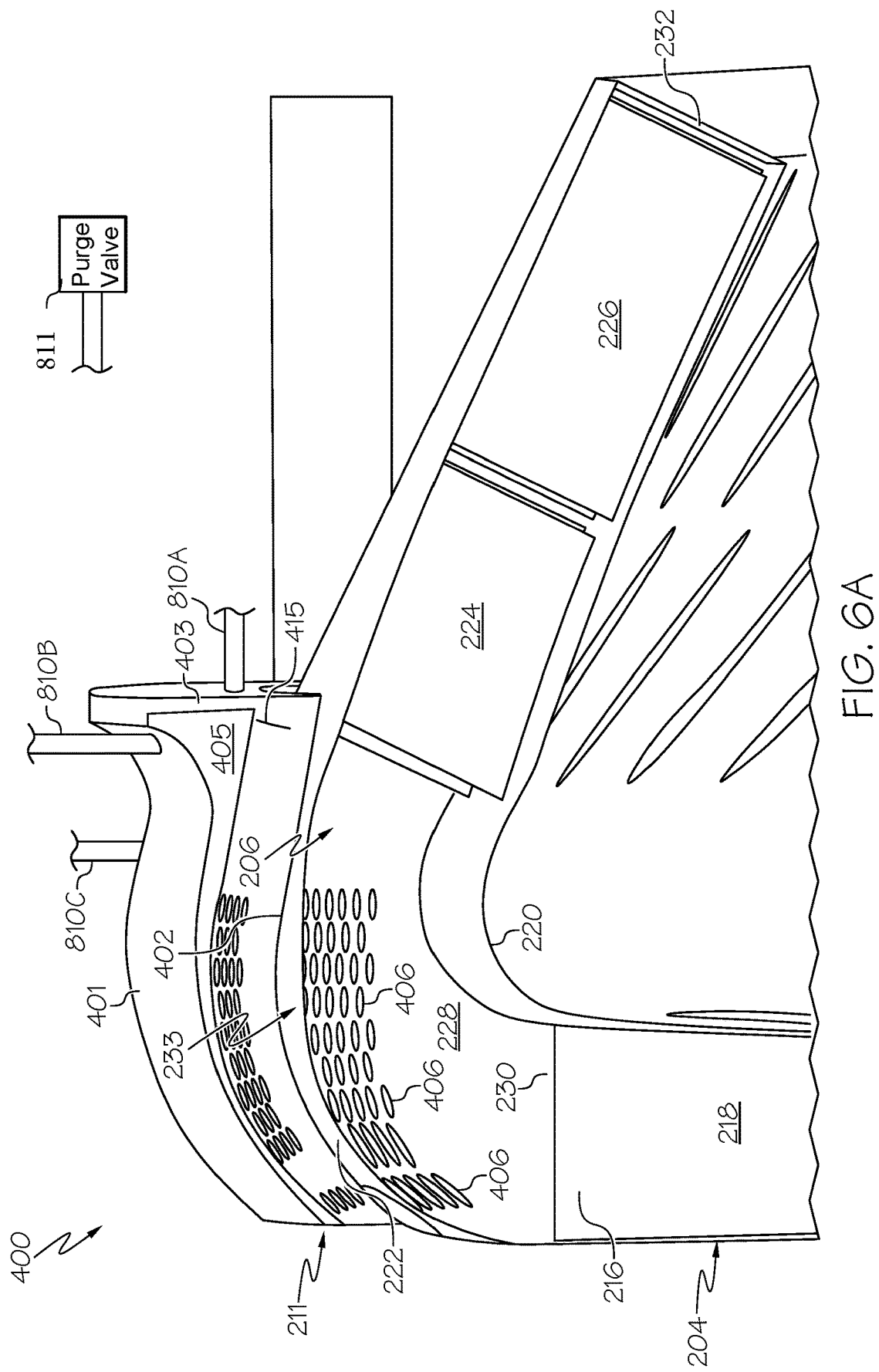

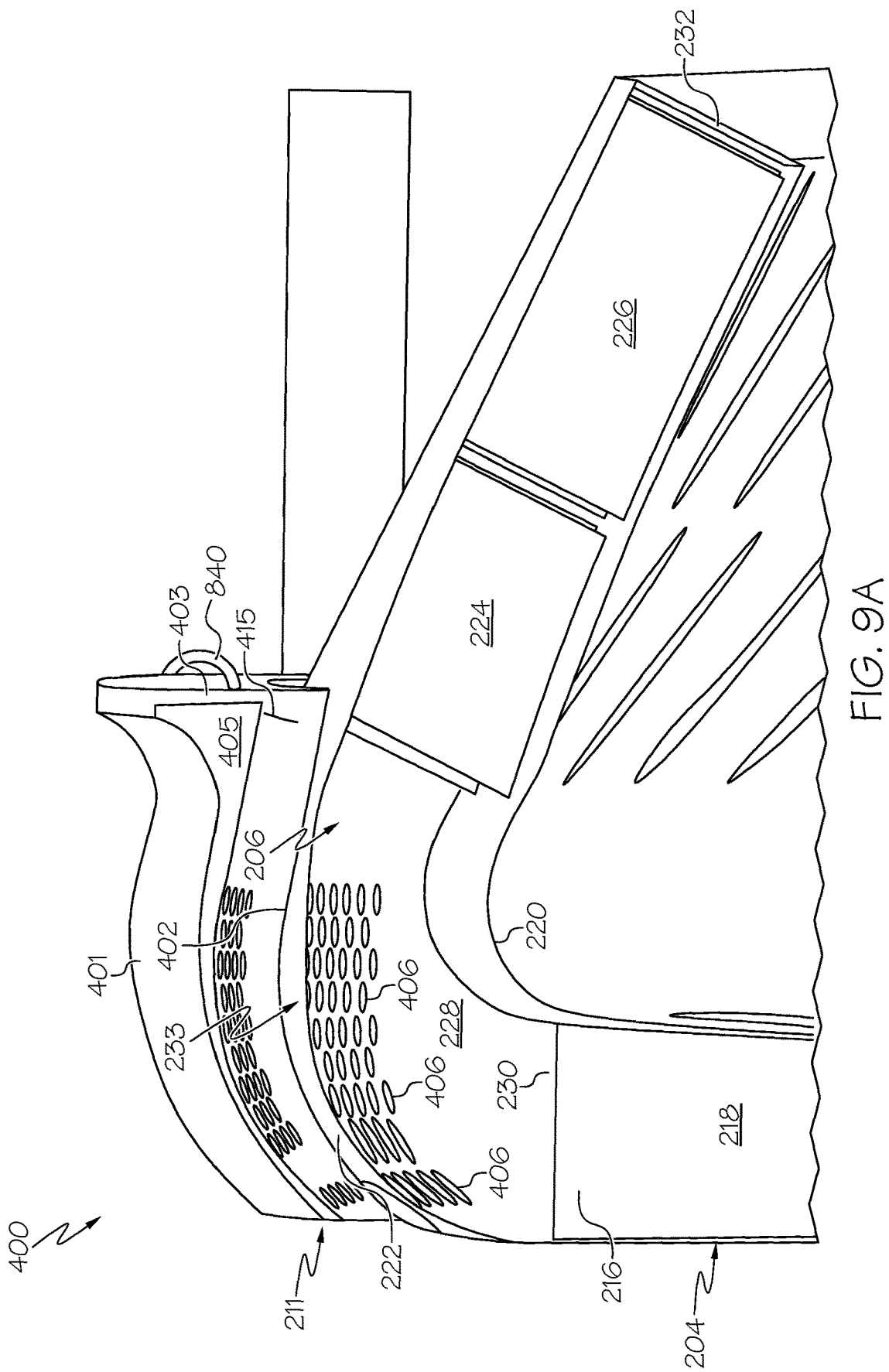

SCAVENGE METHODOLOGIES FOR TURBINE ENGINE PARTICLE SEPARATION CONCEPTS

CROSS-REFERENCE TO RELATED APPLICATIONS

The present application is a divisional of U.S. patent application Ser. No. 15/352,839, filed on Nov. 16, 2016, the contents of which are herein incorporated by reference.

TECHNICAL FIELD

The present disclosure generally relates to turbine engine technologies. More particularly, the present disclosure relates to scavenge methodologies for turbine engine particle separation concepts.

BACKGROUND

Turbine engines are used for a number of purposes, including propulsion and/or driving various other components with electrical, pneumatic, and/or hydraulic power, and may include both propulsion engines (for air, land, and sea vehicles, for example) and auxiliary power units (APUs). Generally, a gas turbine engine includes a compressor section, a combustion section, and a turbine section. During operation, the compressor section draws in ambient air, compresses the air with one or more compressors, and supplies the compressed air to the combustion section. In addition to the compressed air, the combustion section receives fuel via a fuel injection assembly, mixes the fuel with the compressed air, ignites the air/fuel mixture, and supplies the high energy combustion gases to the turbine section to drive one or more turbines, including a shaft that may be used to drive the compressor and otherwise generate power.

During operation, the ambient air drawn into the engine may contain undesirable particles, such as sand and dust, which may cause severe performance degradation, excessive wear, increased maintenance, and eventually premature removal of engines. This is especially true in hot and dry environments, such as desert climates, where such particles are more prevalent in the ambient air. In order to prevent or at least minimize the impacts of particle ingestion into the engine, many vehicles use an inlet particle separator system, disposed upstream of the engine compressor section, to remove at least a portion of the undesirable particles.

Conventional inlet particle separators, such as those described above, operate at relatively high efficiencies for relatively large particles (e.g., >about 20 microns and <about 1000 microns in greatest cross-sectional length). However, for relatively small particles (e.g., <=about 20 microns in greatest cross-sectional length), the efficiencies can be relatively low, resulting in a significant amount of these relatively small particles being ingested into the engine. These relatively small particles may have deleterious effects on the turbine engine during operation. For example, these particles may plug secondary flow lines and/or may melt and form glass on relatively hot engine components, such as the combustor, which can significantly reduce performance and the operating life of the engine.

Commonly-assigned U.S. patent application Ser. No. 15/085,625 (filed Mar. 30, 2016; the contents of which are incorporated by reference herein in their entirety) describes various turbine engine designs for improved small (fine) particle separation efficiency. The present disclosure advances these designs by providing various scavenge methodologies for use in connection with these turbine engine designs. Furthermore, other desirable features and characteristics of the disclosure will become apparent from the subsequent detailed description and the appended claims, taken in conjunction with the accompanying drawings and this background of the disclosure.

BRIEF SUMMARY

The present disclosure relates to turbine engine designs, including propulsion engines and APUs, which utilize scavenge methodologies in connection with particle separation concepts. These scavenge methodologies may be implemented in addition to or as an alternative to those presently-known methodologies used with conventional inlet particle separators deployed upstream of the turbine engine compressor section. In one exemplary embodiment, a method for scavenging small particles from a turbine engine includes the steps of compressing air in a compressor that rotates about a longitudinal axis to generate compressed air. The compressed air that exits the compressor includes at least a tangential flow component and a radial flow component and wherein compressed air comprises a plurality of small particles. The method further includes directing the compressed air through a flowpath, downstream of the compressor, which causes a reduction in the radial flow component and the introduction of or an increase in an axial flow component, removing a portion of the compressed air from the flowpath and directing the portion into a scavenge plenum, the scavenge plenum being positioned adjacent to and radially outward from the flowpath, and returning the portion of the compressed air from the plenum to the flowpath while maintaining a majority of the small particles that were present in the portion within the scavenge plenum. Still further, the method includes removing the majority of the small particles from the plenum. The step of removing occurs intermittently during engine operation, during engine shutdown, or while the engine is not operation, but does not occur continuously during engine operation.

This Brief Summary is provided to describe select concepts in a simplified form that are further described in the Detailed Description. This Brief Summary is not intended to identify key or essential features of the claimed subject matter, nor is it intended to be used as an aid in determining the scope of the claimed subject matter.

BRIEF DESCRIPTION OF THE DRAWINGS

The present disclosure will hereinafter be described in conjunction with the following drawing figures, wherein like numerals denote like elements, and wherein:

FIGS. 2A-B, 3A-B, 4A-B, and 5A-B are cross section (A) and perspective views (B) of a first small particle separation means in accordance with some embodiments of the present disclosure that utilizes various scavenging methodologies;

FIGS. 6A-B, 7A-B, 8A-B, and 9A-B are cross section (A) and perspective views (B) of a second small particle separation means in accordance with some embodiments of the present disclosure that utilizes various scavenging methodologies;

DETAILED DESCRIPTION

Figure 1:
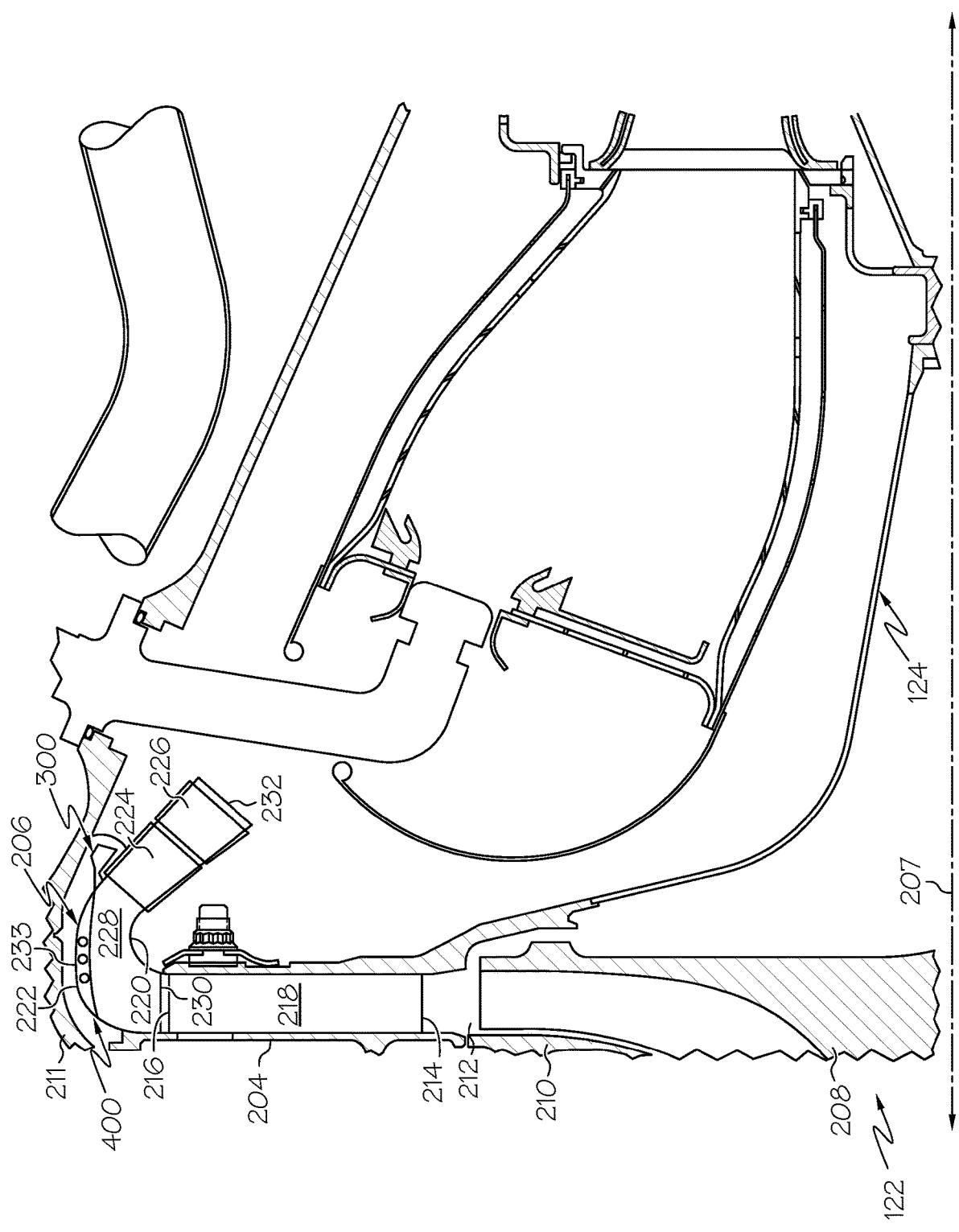
FIG. 1 is a cross section view of portions of an exemplary compressor and combustor section of a turbine engine, illustrating various scavenge plenum implementations.

The following detailed description is merely exemplary in nature and is not intended to limit the invention or the application and uses of the invention. As used herein, the word "exemplary" means "serving as an example, instance, or illustration." Thus, any scavenge methodology embodiment described herein as "exemplary" is not necessarily to be construed as preferred or advantageous over other embodiments. All of the embodiments described herein are exemplary embodiments provided to enable persons skilled in the art to make or use the invention and not to limit the scope of the invention which is defined by the claims. As further used herein, the word "about" means a possible variance (+/−) of the stated value of up to 10%, or alternatively up to 5%. Furthermore, there is no intention to be bound by any expressed or implied theory presented in the preceding technical field, background, brief summary, or the following detailed description. For example, the present disclosure discusses computational fluid dynamics (CFD), which should be understood as a non-limiting theory.

By way of introduction, the following concepts are applicable to the scavenge methodologies presented in this disclosure. First, in accordance with some embodiments of the disclosed methodologies, the relatively-small particles noted above can be efficiently collected into a scavenge plenum, located downstream of the compressor section of the turbine engine, with zero scavenge flow. This means that there is no flow loss or continuous "bleed" flow required to operate these methodologies. In this manner, all of the compressed air is able to ultimately travel downstream to the compressor, with no loss of engine performance Instead of a continuous scavenge flow, the presently disclosed methodologies may, in some embodiments, utilize a scavenge "purge" process, wherein the small particles are removed from the scavenge plenum, which can be accomplished intermittently during engine operation, during engine shutdown, or while the engine is not operating.

Next, in accordance with some embodiments of the disclosed methodologies, a relatively high tangential velocity (as used herein, for example in the case of a centrifugal compressor, "tangential" velocity refers to the air flow vector tangent to the radial velocity component of the compressor at any point along the shroud; the term "relatively high" will be understood to be engine-design specific, but generally denotes a tangential velocity that is at least 50% of the tangential velocity of the air immediately upon exit from the compressor) is maintained within the scavenge plenum, which causes the small particles in the scavenge plenum to remain at a relatively high flow radius (as used herein, the flow "radius" refers to the radial distance from the longitudinal (rotational) axis of the operating turbine engine). This relatively high tangential velocity may be accomplished by adequate air flow exchange in and out of the scavenge plenum as the engine is operating. Causing the small particles to remain in the plenum based on the tangential air flow velocity allows the operation of the turbine engine, as noted above, with zero continuous scavenge flow, wherein the particles need only be purged intermittently during operation, upon shutdown, or during other non-operational times.

In a further aspect, various alternative embodiments exists for the purpose of ultimate removal of the small particles from the scavenge plenum in accordance with the present disclosure. For example, in one embodiment, withdrawal of the small particles and air from the scavenge plenum may be accomplished by one or more ports positioned in an axial, radial, circumferential, or compound angle (some combination of two or more of axial, radial, and circumferential) orientation, with a downstream "smart" particle removal system (such as an electronically controlled smart purge valve) to regulate timing and quantity of air flow. The smart purge valve may be configured, for example, to operate intermittently during engine operation, and/or upon engine shutdown. In another embodiment, the scavenge plenum may be designed in the form of scroll with at least one tangential outlet. The outlet(s) of scavenge plenum may be connected to the engine exhaust via smart particle removal mechanisms such as electronically controlled purge valve, as set forth above. In another embodiment, in place of or in addition to a smart valve or outlet, the scavenge plenum may employ one or more small particle filters that are sized and positioned to collect small particles within the scavenge plenum as the air flows there-through at the above-noted relatively high tangential velocity. These filters may be removed for cleaning purposes when the engine is not operating. In yet another embodiment, one or more bypass circuits may be added to the scavenge plenum to extract small particle laden flow from the scavenge plenum to trap the particles in a filter, and to return relatively cleaner (i.e., less small particle laden) air back to the scavenge cavity. This bypass circuit arrangement eliminates the use of a purge valve or outlet, but allows the particles to be accumulated in a filter which, as with the preceding embodiment, may be changed when the engine is not operating. Illustrations of exemplary implementations of the scavenge methodologies set forth by way of introduction above are provided in the Figures that accompany this disclosure.

As initially noted above, a gas turbine engine may be used to power various types of vehicles and systems. Various turbine engine implementations may include a fan section, a compressor section, a combustor section, a turbine section, and an exhaust section. The scavenge plenums described herein are typically implemented after a compressor section but before the combustor section, and accordingly the present disclosure focuses on those two sections of the turbine engine primarily. In some turbine engines, the compressor section is implemented with a centrifugal-type compressor. In other turbine engines, the compressor section is implemented with a mixed-flow-type compressor. The presently-described methodologies should be understood as equally-applicable to either type of compressor design, as both types introduce a tangential component to the air flow, and examples of both are provided herein. Moreover, it should be appreciated that the scavenge methodologies are equally applicable to single or dual stage compressors, and that the scavenge plenum may be introduced in the turbine engine design after either or both compressor stages in the case of a dual stage compressor design.

With reference now to FIG. 1, an exemplary cross section of the area between a centrifugal compressor 122 and an annular combustor 124 is illustrated. Compressor 122 may be a single stage compressor, or it may be the second (high pressure) stage of a dual stage compressor. In addition to the compressor 122 and combustor 124, FIG. 1 depicts a radially-oriented diffuser 204 and a deswirl assembly 206, each disposed about a longitudinal axis 207. In this embodiment, as noted above, the compressor 122 is embodied as a centrifugal compressor and includes an impeller 208 and a shroud 210 disposed in a compressor housing 211. The impeller 208, as alluded to above, is driven by a turbine and rotates about the longitudinal axis 207. The shroud 210 is disposed around the impeller 208 and defines an impeller discharge flow passage 212 therewith that extends radially outward from longitudinal axis 207. While a radial compressor 122 is disclosed, other types, including mixed flow, may be employed as well in other embodiments.

The diffuser 204 is coupled to the shroud 210 and is configured to decrease the velocity and increase the static pressure of air that is received from impeller 208. In this regard, any one of numerous conventional diffusers 204 suitable for operating with a centrifugal compressor may be employed. In any case, the diffuser 204 includes an inlet 214, an outlet 216, and a flowpath 218 that each communicates with the impeller discharge flow passage 212, and the flowpath 218 is configured to direct the received air flow radially outward.

The deswirl assembly 206 communicates with the diffuser 204 and is configured to substantially remove swirl from air received therefrom, to thereby decrease the Mach number of the air flow. The deswirl assembly 206 includes an inner annular wall 220, an outer annular wall 222, and pluralities of vanes 224, 226 disposed between the inner annular wall 220 and the outer annular wall 222. The walls 220, 222 define a flowpath 228 that is configured to redirect the air from its radially outward direction to a radially inward and axially downstream direction. In this regard, the walls 220, 222 are formed such that the flowpath 228 extends between an inlet 230 and outlet 232 in an arc 233 so that when the air exits the outlet 232, it is directed at an angle toward the longitudinal axis 207 and the annular combustor 124. As the angle of the arc 233 is increased the variation of the air angle between the inner wall 220 and out wall 222 is increased. The vanes 224, 226 reduce the tangential (circumferential) flow component of the air. Accordingly, scavenge plenums in accordance with the present disclosure are typically implemented prior to (upstream of) the vanes 224, 226, in order to maintain the relatively high tangential flow within the scavenge plenums, consistent with the scavenge methodologies described herein.

As noted above, a turbine engine may be configured with an inlet particle separator, located upstream of the compressor section, for purposes of efficiently removing relatively large particles from the inlet air stream. However, finer particles, such as those smaller than about 20 microns may elude the inlet particle separator, and proceed into the turbine engine compressor section. Thus, the presently-disclosed methodologies are implemented using small particle scavenge means 300 and/or 400, which may be located downstream of compressor 122, as an alternative or in addition to an inlet particle separator, that serve to efficiently separate any smaller particles from the air stream, and thus prevent such smaller particles from entering into the combustor 124. With continued reference to FIG. 1, in one embodiment, a first small particle scavenge means 300 may be embodied as a scavenge plenum connected to the deswirl assembly flowpath 228 using an extraction slot through the deswirl assembly outer annular wall 222 downstream of the arc 233. In another embodiment, a second small particle separation means 400 may be embodied as scavenge plenum connected to the deswirl assembly flowpath 228 using a plurality of holes (or other intermittent apertures) in the deswirl assembly outer annular wall 222 along the length of the arc 233. In yet another embodiment, a third small particle separation means may be embodied as a hybrid combination of small particle separation means 300 and 400. Each of the first, second, and third separation means is described in greater detail below and in connection with the accompanying Figures of this disclosure.

Turning now to the first small particle separation means 300, as detailed in FIGS. 2A-B, 3A-B, 4A-B, and 5A-B, illustrated in particular is the deswirl assembly flowpath 228, which as noted above is formed between the inner and outer deswirl annular walls 220, 222. As shown, the compressed air, once passing through the diffuser 204 (via diffuser flowpath 218), enters into the deswirl assembly 206 at the deswirl inlet 230. The deswirl assembly arc 233 changes the flow direction of the compressed air from a radially outward direction from the longitudinal axis 207, to an axially rearward direction (towards the combustor section 124) that also include a small radially inward (downward) component, as illustrated. With the use of computational fluid dynamics (CFD), it has been discovered that small particles in the compressed air flow stream tend to track closely to the outer annular wall 222 as the flow changes from the radially outward direction to the axially rearward direction (i.e., along the arc 233).

The extraction slot 306 may be embodied as a continuous circumferential slot, a discontinuous circumferential slot or as a series of circumferentially-disposed holes/apertures of any shape or count. The extraction slot is axi-symmetrical (with regard to axis 207), and may encompass from about 1% to about 25%, such as about 1% to about 15%, of the area (along a plane perpendicular to the longitudinal axis 207) of the flowpath 228, said plane being circumscribed by the housing 211. The extraction slot 306 is located along the deswirl flowpath 228 at a position downstream of the arc 233, yet prior to the plurality of vanes 224, 226, and as such a relatively high tangential flow remains in the air as it encounters the slot 306. Further, the tangential velocity is maintained via continuous air flow in and out of the slot, but with zero scavenge flow (i.e., zero flow loss from the scavenge plenum 305). In one embodiment, the scavenge plenum 305 is located radially outward from the deswirl assembly 206 at a position that is radially adjacent to the first (upstream) plurality of vanes 224. The scavenge plenum 305 includes an inner radial wall 302, an outer radial wall 301, and an axial end wall 303 positioned at an opposite axial (downstream) end of the plenum 305 with respect to the extraction slot 306. In one embodiment, as illustrated, that a radius of the outer radial wall 301 that connects with the axial end wall 303 is greater than the radius at which the extraction slot 306 is located, and likewise, it is preferred that a radius of the inner radial wall 302 that connects with the axial end wall 303 is at a lower radius than the radius at which the extraction slot 306 is located, all with respect to the longitudinal axis 207. In the illustrated embodiment, the aforesaid small radially inward component of the flow direction is commenced at the plurality of vanes 224, 226 by the vanes 224, 226 being oriented somewhat radially inward (e.g., about 10 to about 45 degrees). As such, the inner radial wall 302 of the scavenge plenum 305 may also have the same radial declination so as to remain parallel and adjacent to the first plurality of vanes 224, as noted above.

Figure 2A:
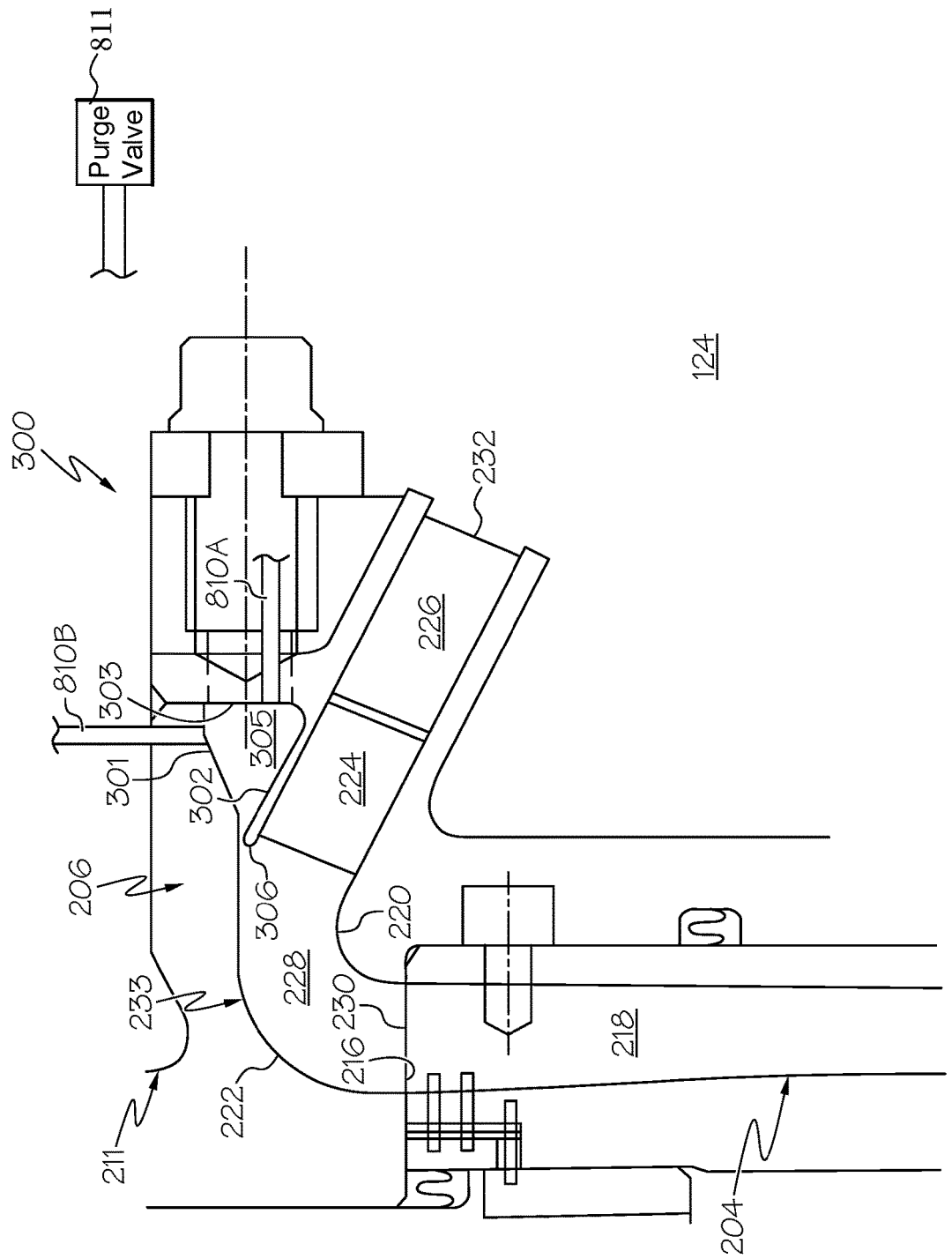
Figure 2B:
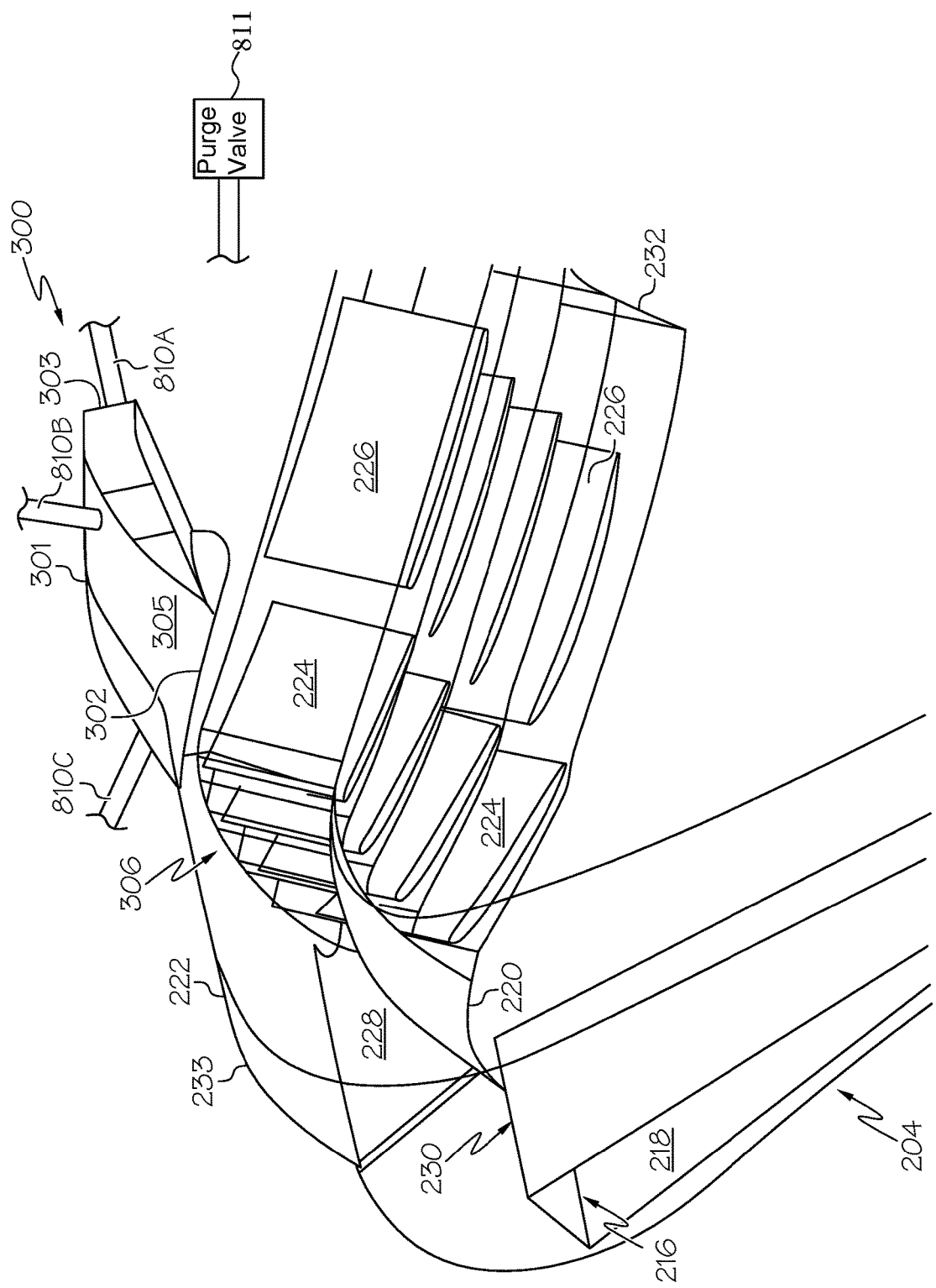

The first small particle separation means 300 may employ one of various scavenge methodologies in accordance with embodiments of the present disclosure. As shown in FIGS. 2A-B, in one embodiment, withdrawal of the small particles and air from the scavenge plenum may be accomplished by one or more ports 810A-C positioned in an axial (810A), radial (810B), or circumferential (810C) angle (or compound angle, i.e., some combination of two or more of axial, radial, and circumferential) orientation, with a downstream "smart" particle removal system 811 (such as an electronically controlled smart purge valve) to regulate timing and quantity of air flow. The smart purge valve 811 may be configured, for example, to operate intermittently during engine operation, and/or upon engine shutdown.

Figure 3A:
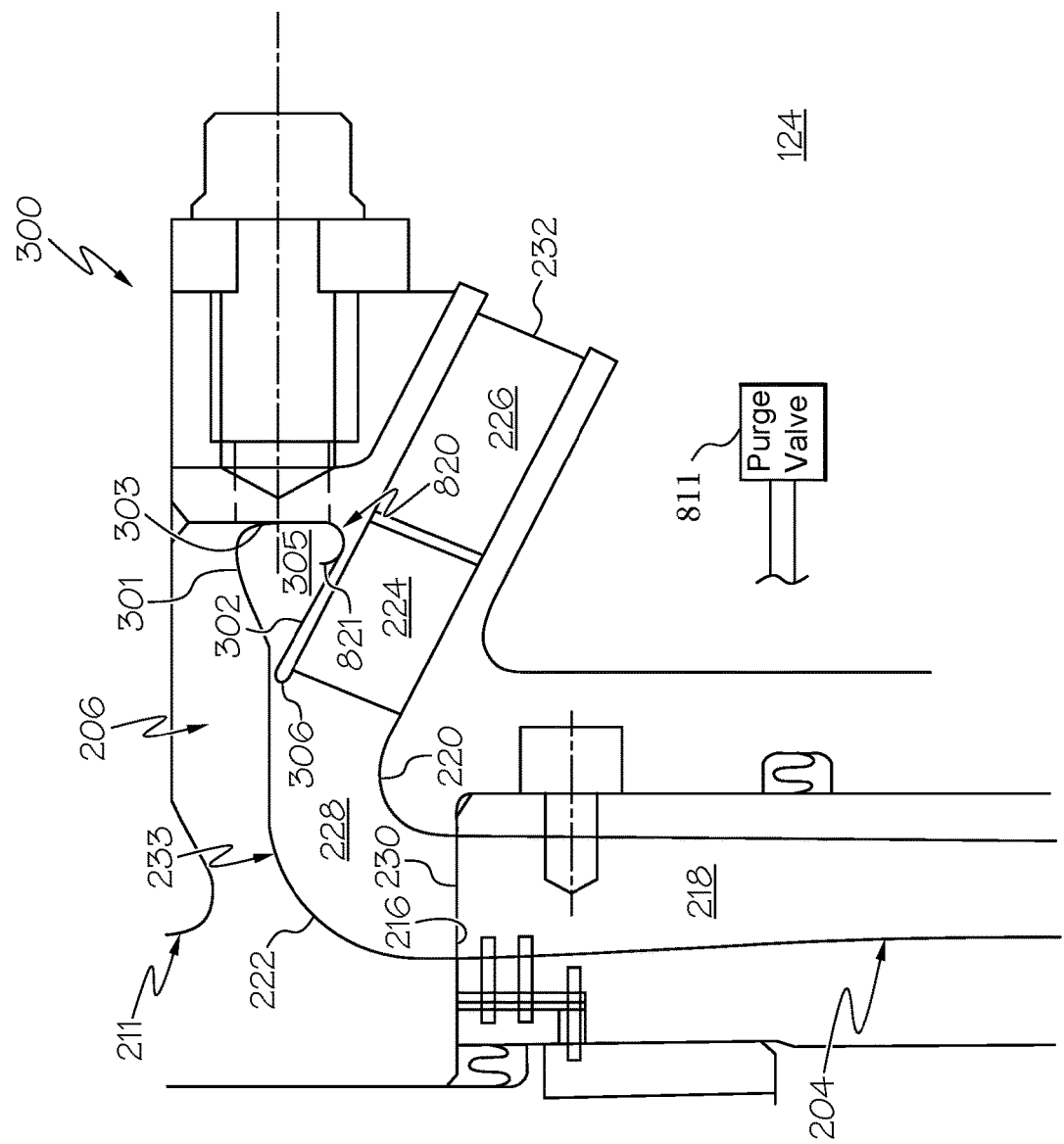
Figure 3B:
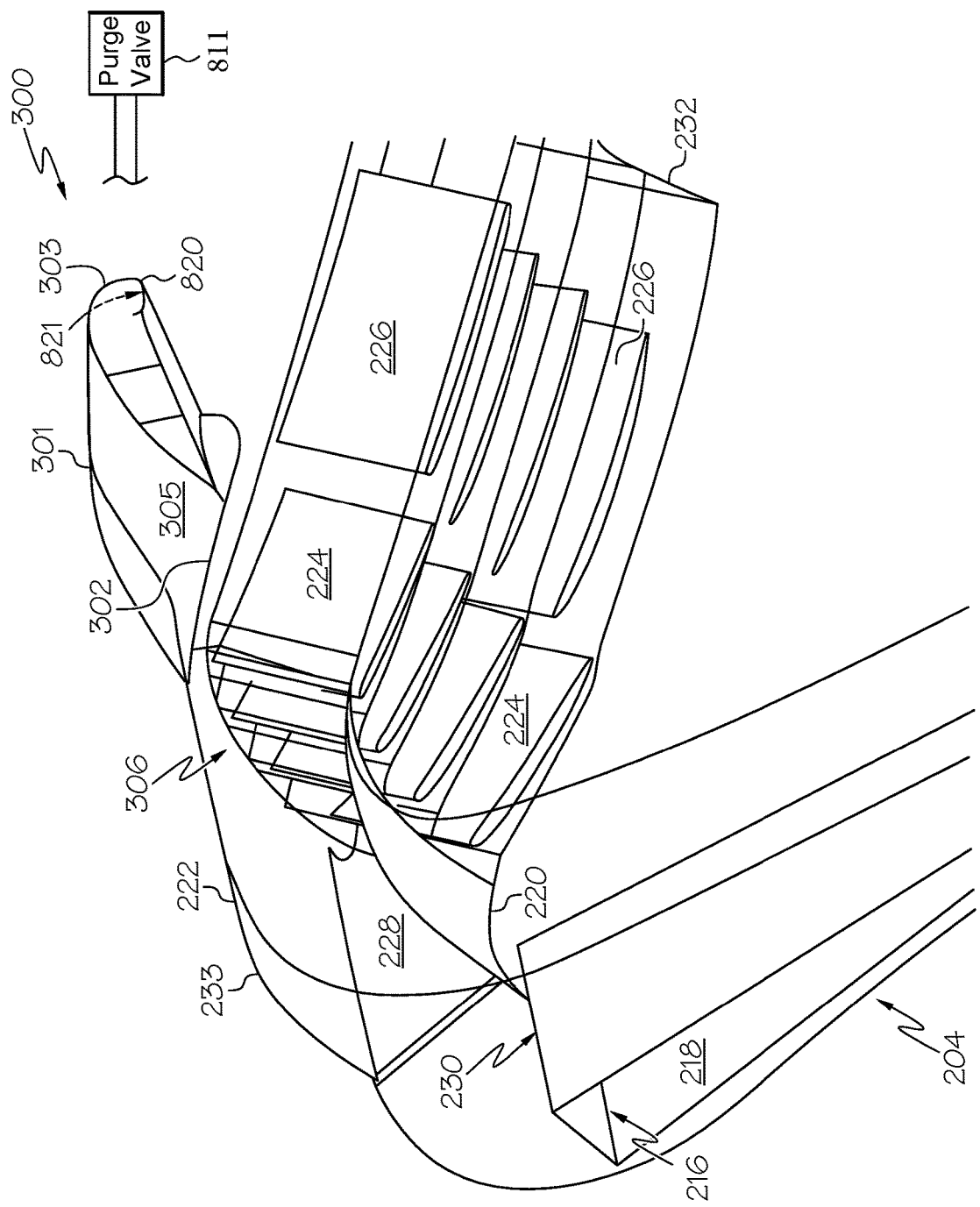

In another embodiment, as shown in FIGS. 3A-B, withdrawal of the small particles and air from the scavenge plenum may be accomplished using a scroll with a tangential outlet. That is, the scavenge plenum 305 may be designed and configured as scroll 820 with tangential outlet 821. The outlet(s) 821 of scavenge plenum 305 may be connected to the engine exhaust via smart particle removal mechanisms such as electronically controlled purge valve 811, as set forth above.

Figure 4A:
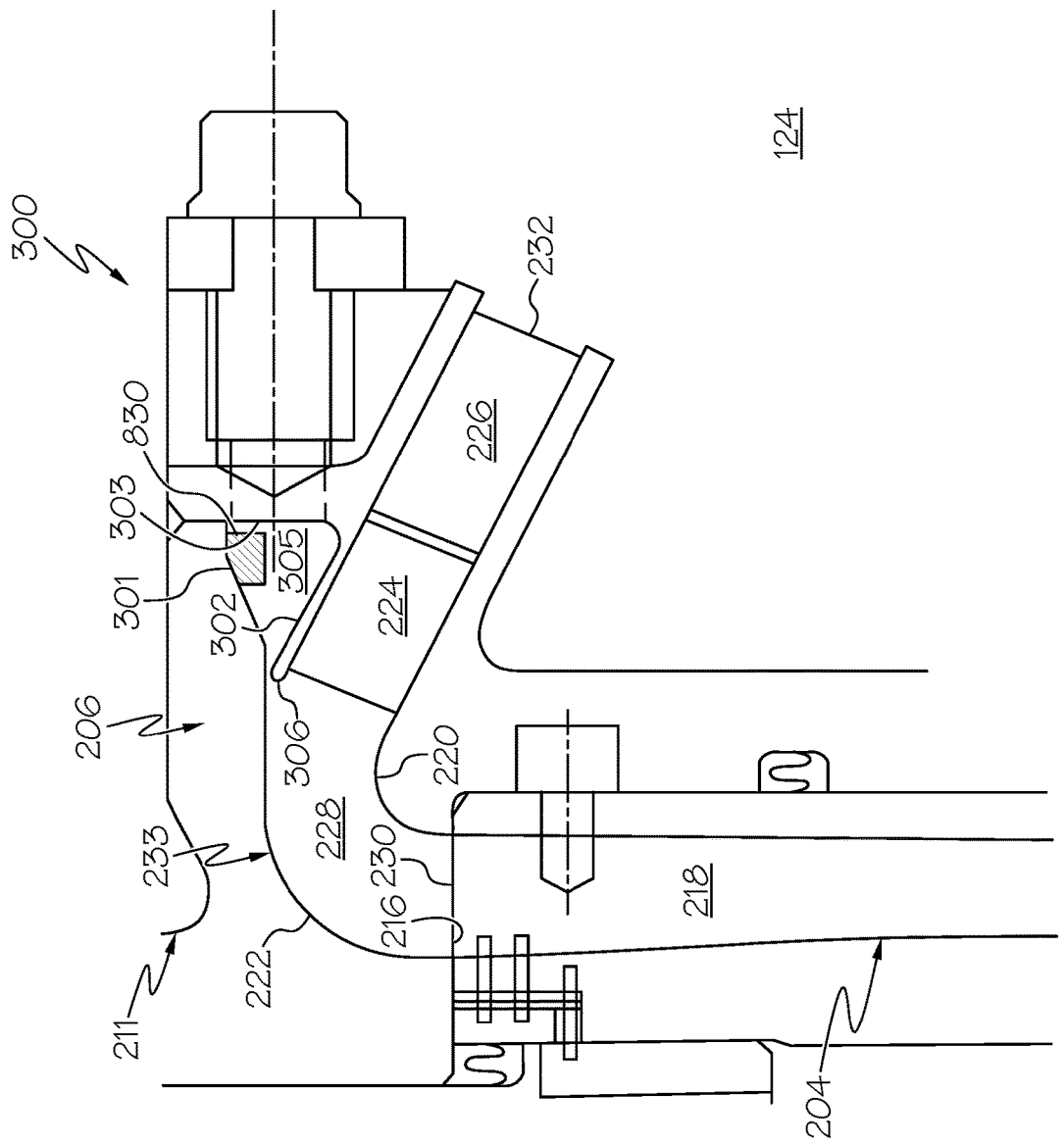
Figure 4B:
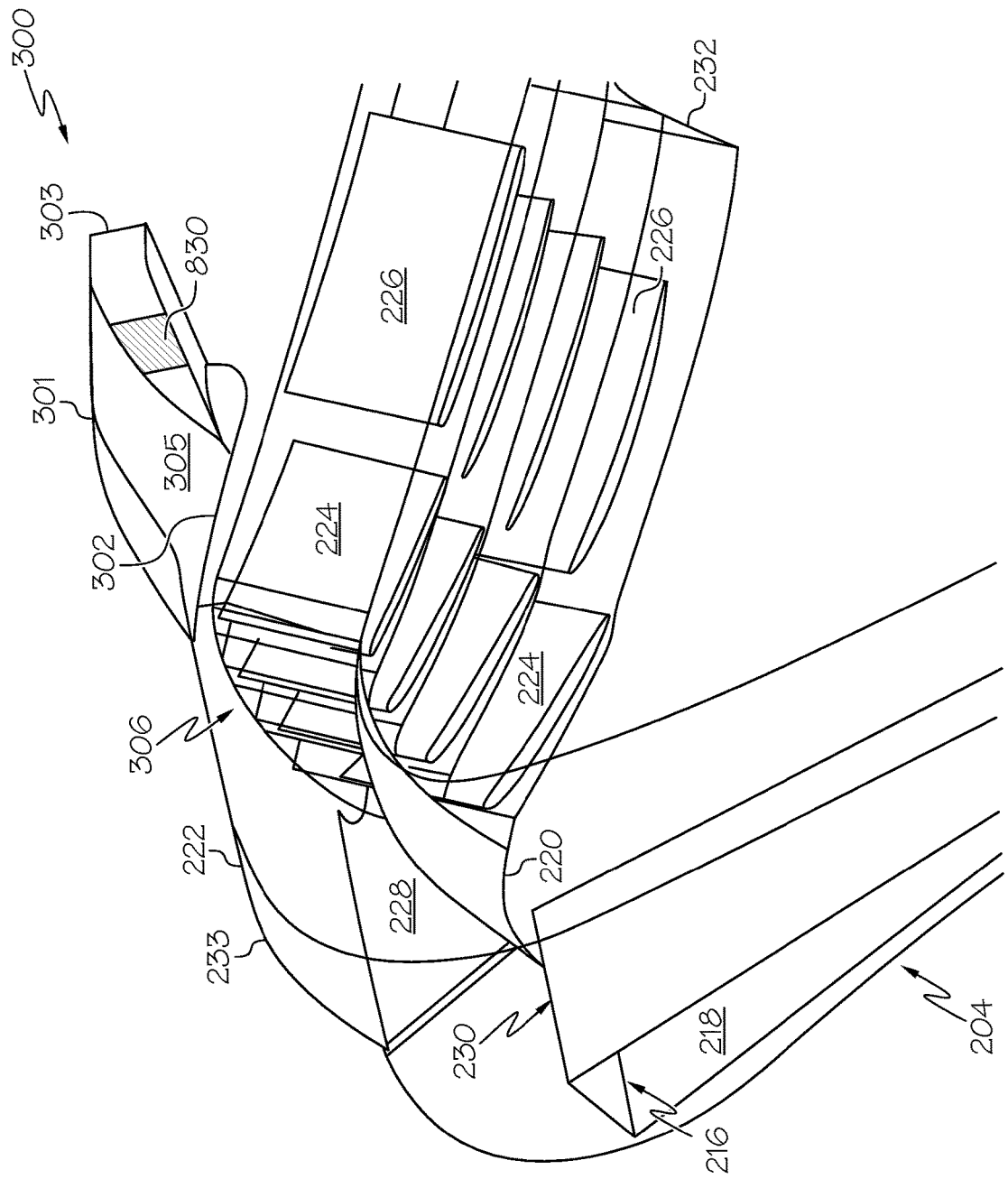

In another embodiment, as shown in FIGS. 4A-B, in place of or in addition to a smart valve or outlet (811), the scavenge plenum may employ one or more small particle filters 830 that are sized and positioned to collect small particles within the scavenge plenum as the air flows therethrough at the above-noted relatively high tangential velocity. These filters 830 may be removed for cleaning purposes when the engine is not operating, for example after the engine is shut down. Accordingly, the small particles are removed from the plenum 305 as a consequence of the filter 830 removal and cleaning, and a purge valve/outlet may not be required.

Figure 5A:
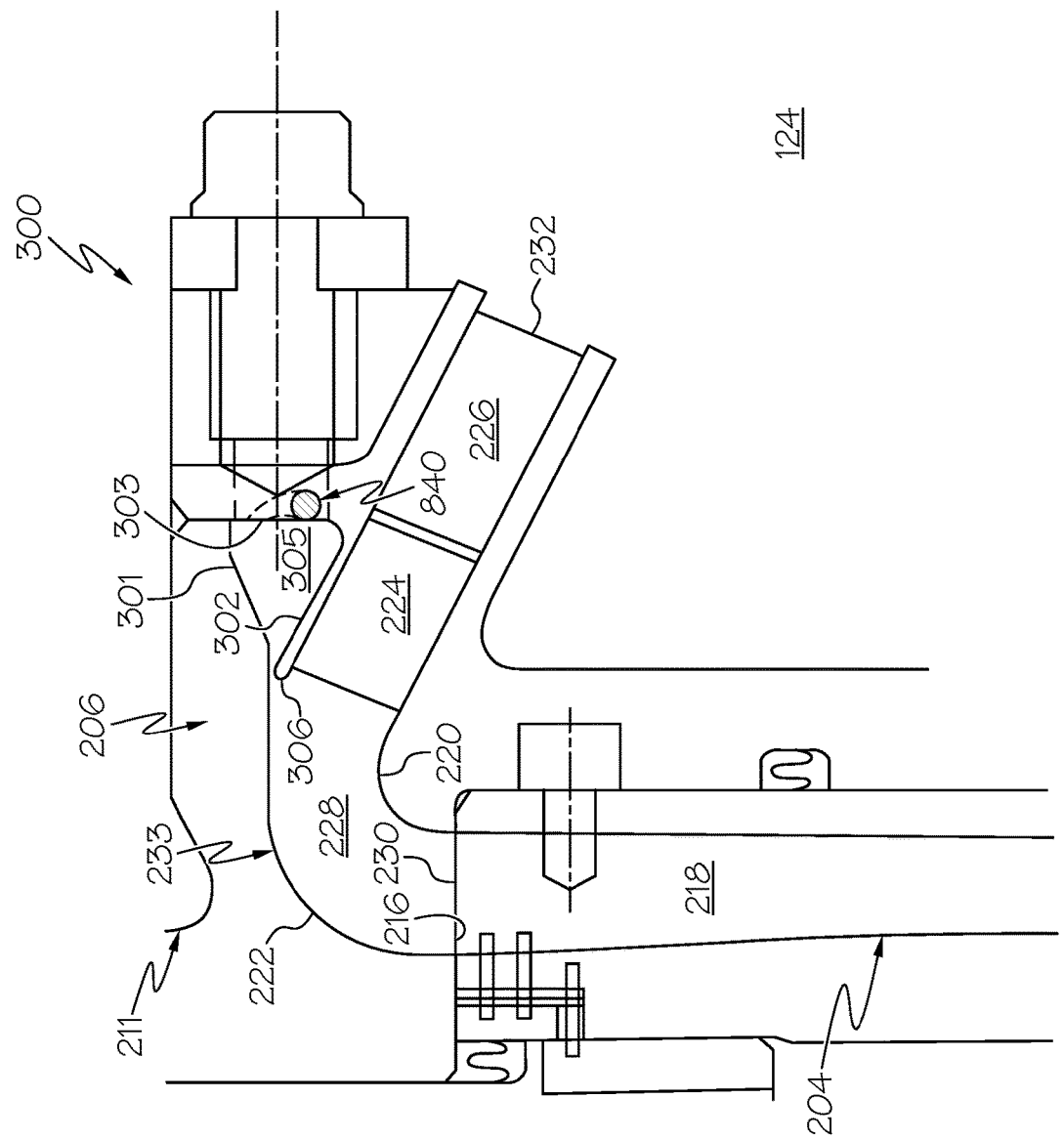

In yet another embodiment, as shown in FIGS. 5A-B, one or more bypass circuits 840 may be added to the scavenge plenum 305 to extract small particle laden flow from the scavenge plenum to trap the particles in a filter, for example, and to return relatively cleaner (i.e., less small particle laden) air back to the scavenge cavity 305. This bypass circuit 840 arrangement may eliminate the use of a purge valve or outlet, but allows the particles to be accumulated in a filter which, as with the preceding embodiment, may be changed when the engine is not operating. Accordingly, the small particles are removed from the plenum 305 as a consequence of the filter removal and cleaning. In the illustrated embodiment, the bypass circuit 840 FIGS. 5A-B is shown in the axial wall end 303. In other embodiments, the bypass circuit 840 may be located in the outer radial wall 301.

In operation, therefore, the compressed air that exits the diffuser 204 at diffuser outlet 216 will enter the deswirl assembly at inlet 230. Any small particles in the compressed air, as it passes through the deswirl flowpath 228, will tend to track along the arc 233 of outer annular wall 222. Prior to encountering the plurality of vanes 224, 226 (and thus prior to the radial declination at the vanes), the small particles will be extracted from the flowpath 228 at the extraction slot 306 located along the outer annular wall 222, and enter into the scavenge plenum 305. In this manner, the small particles are efficiently prevented from entering the combustor section 124, which as illustrated, is positioned axially downstream from the second plurality of vanes 226 and deswirl assembly outlet 232. Any small particle accumulation in the scavenge plenum 305 may be removed from time to time by an using any of the foregoing-described scavenge methodologies: Namely, the scavenge methodology employed with the plenum 305 may be any of a port 810A-C coupled with a smart purge valve 811, a scroll configuration 820 with outlet 821 coupled with the smart purge valve 811, a filter 830, or a bypass circuit 840 with filter.

Figure 6B:
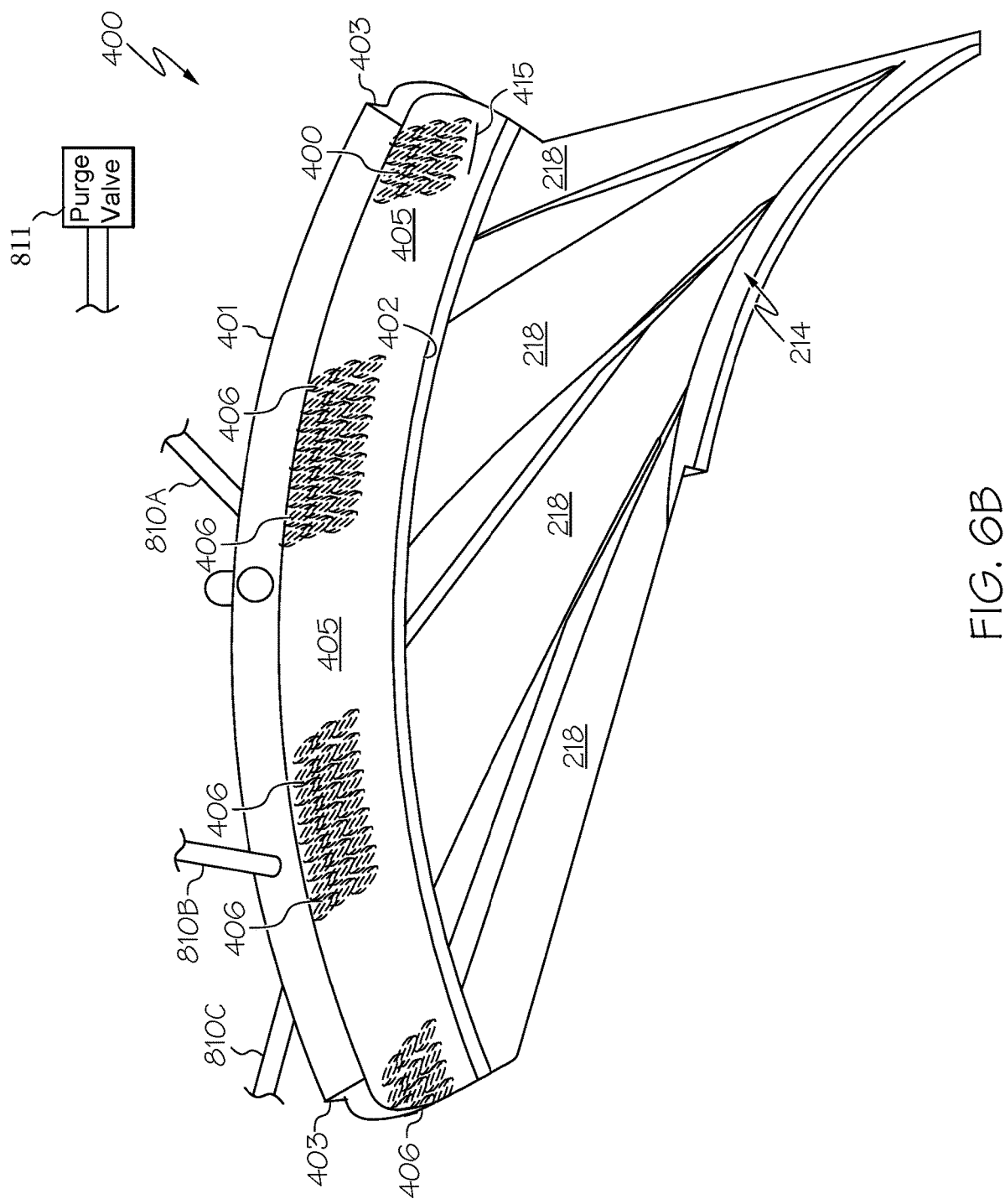

Referring now to the second small particle separation means 400, as detailed in FIGS. 6A-B, the deswirl assembly outer annular wall 222 is fitted with a plurality of holes (or other apertures, of any shape) 406 along the arc 233. The holes 406 extend through the outer annular wall 222 and the shroud 211 and open into a scavenge plenum 405, the scavenge plenum 405 being positioned radially outward from and adjacent to the deswirl assembly 206 along the arc 233. Although the diameter (or greatest cross-section) of the holes 406 may vary from embodiment to embodiment, in a typical embodiment, the holes 406 may have a diameter of about 0.03 inches to about 0.07 inches, such as about 0.05 inches. The spacing between the holes 406 in circumferential rows may be equal to or greater than one diameter of the holes, whereas axial spacing between rows may be staggered to allow the maximum number of holes while maintaining the integrity of the outer annular wall 222 and the shroud 211. In order to preserve the tangential velocity of the compressed air exiting the diffuser 204 in scavenge plenum 405, so that small particles may continue to rotate freely in the tangential direction in scavenge plenum 405, remain in the plenum, and negate the need for a continuous scavenge flow bleed, as noted above, the plurality of holes 406 have a circumferential angle or "lean" that may be from about 25 to about 65 degrees with respect to the outer annular wall 222, such as from about 35 to about 55 degrees (that is, the holes 406 do not extend purely in the radial direction, but rather have the aforesaid circumferential lean). Moreover, given the change in direction from substantially radial to substantially axial along the deswirl assembly flowpath 228, the plurality of holes may also have an axial (downstream, toward the combustor 124) angle or lean that may be from about 5 to about 20 degrees, for example from about 10 to about 15 degrees, again with respect to the outer annular wall 222. In addition, the scavenge plenum 405 scavenge has a section of higher radius (i.e., the plenum 405 has a thickness in the radial direction, portions thereof closest to the outer annular wall 222 being of lower radius, portions thereof farthest from the outer annular wall 222 being a higher radius) so that the already trapped small particles may continue to rotate freely in the tangential direction and negate the need of active scavenge flow bleed.

Figure 7A:
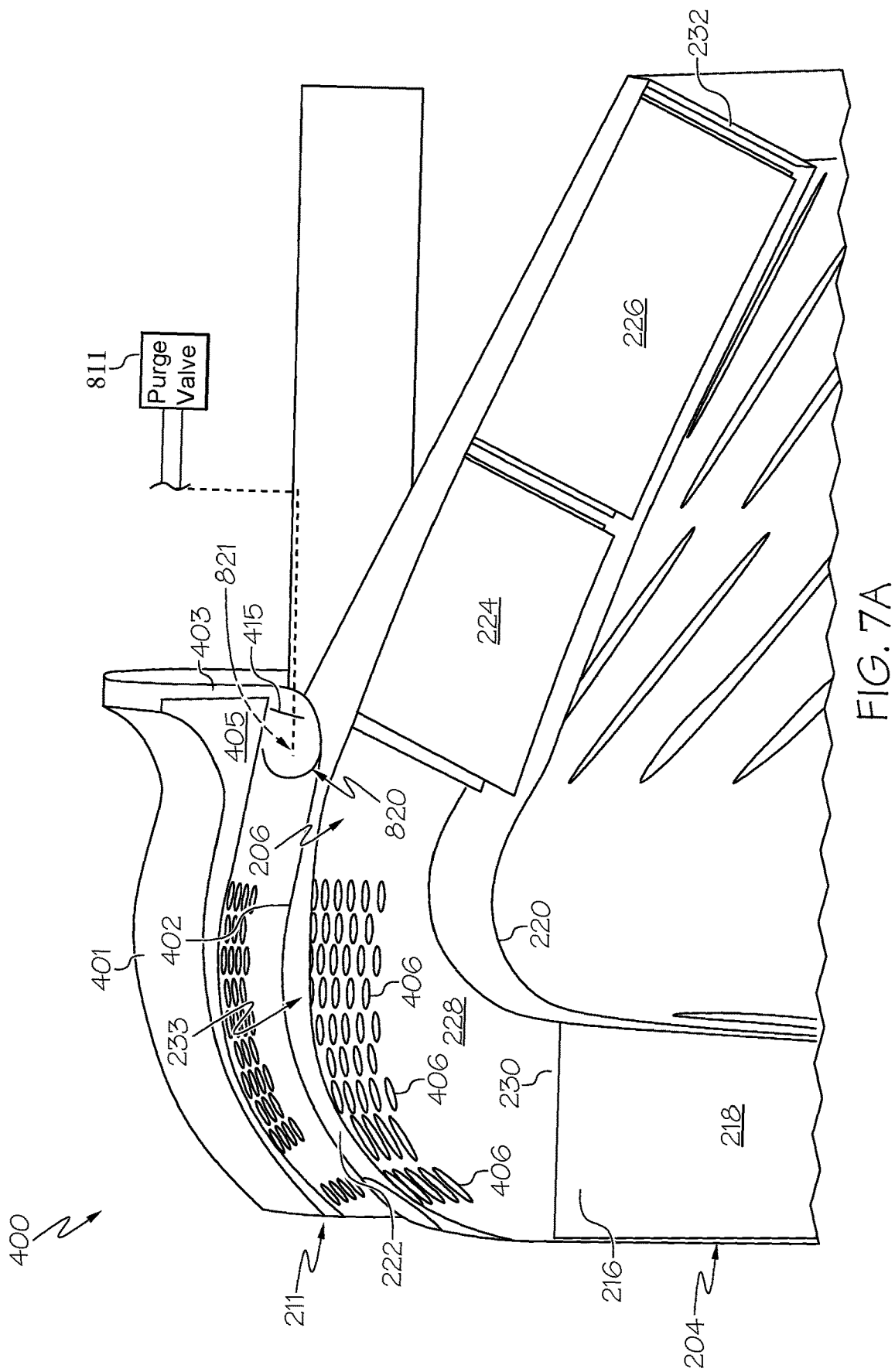
Figure 7B:
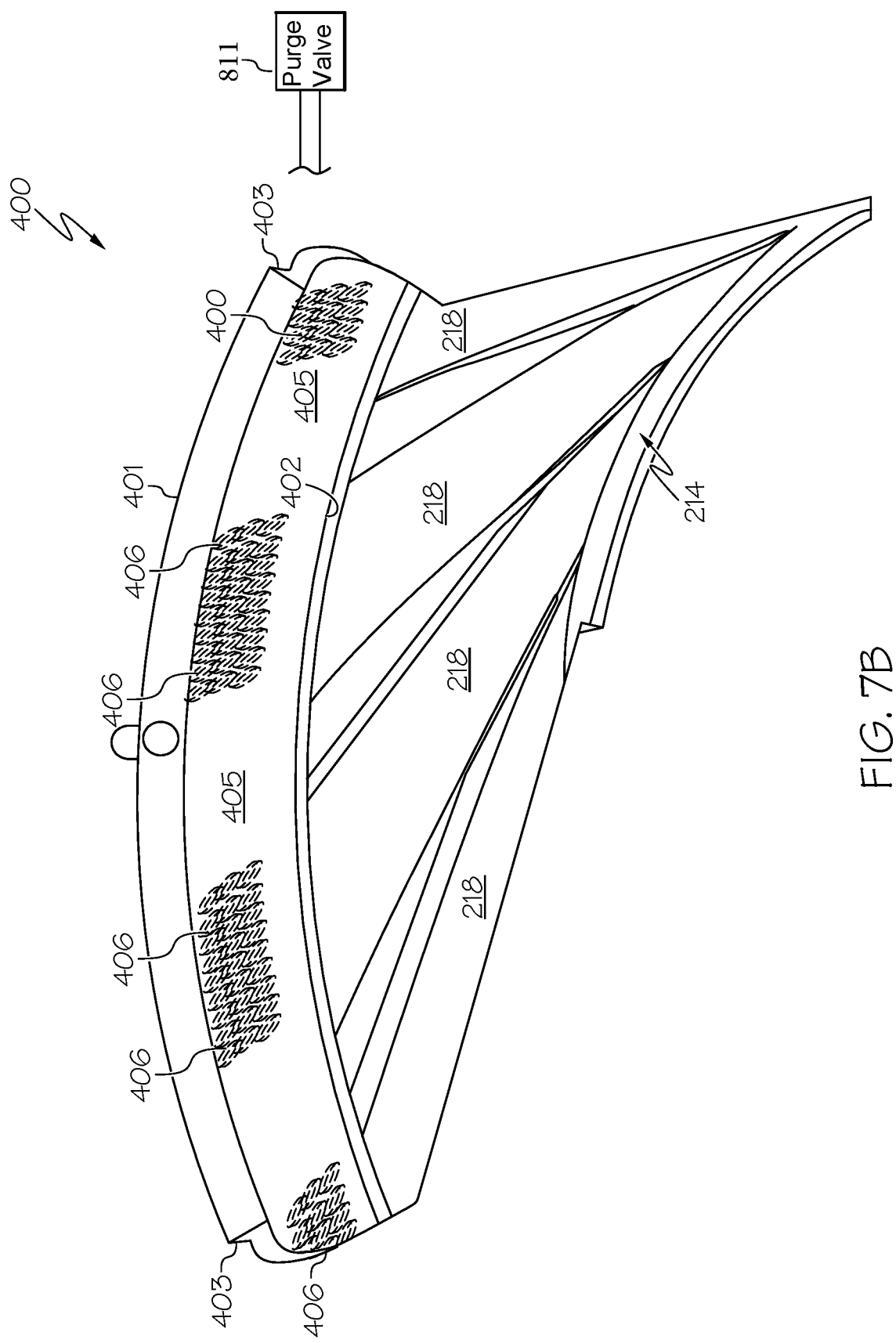
Figure 8A:
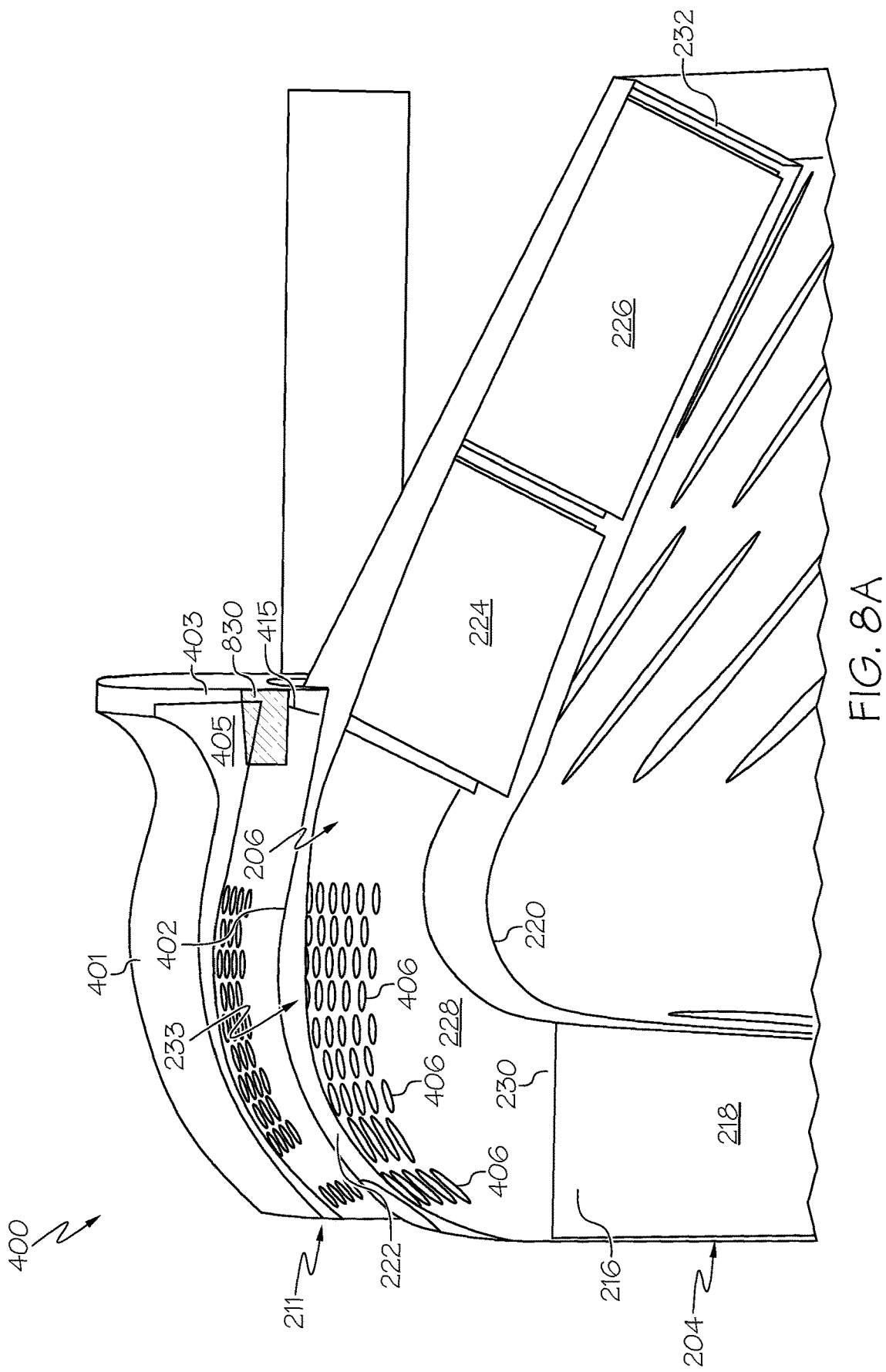
Figure 8B:
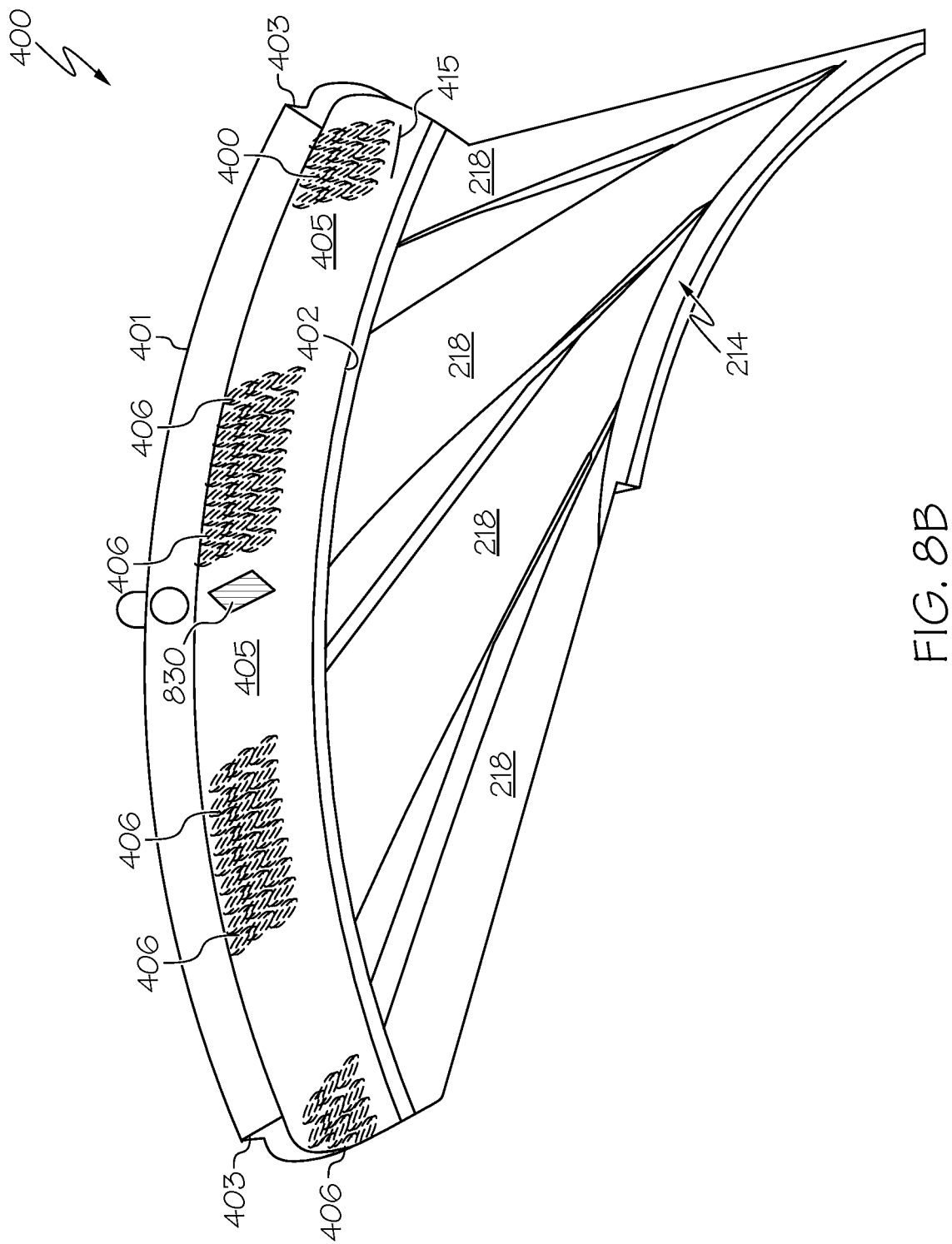
Figure 9B:
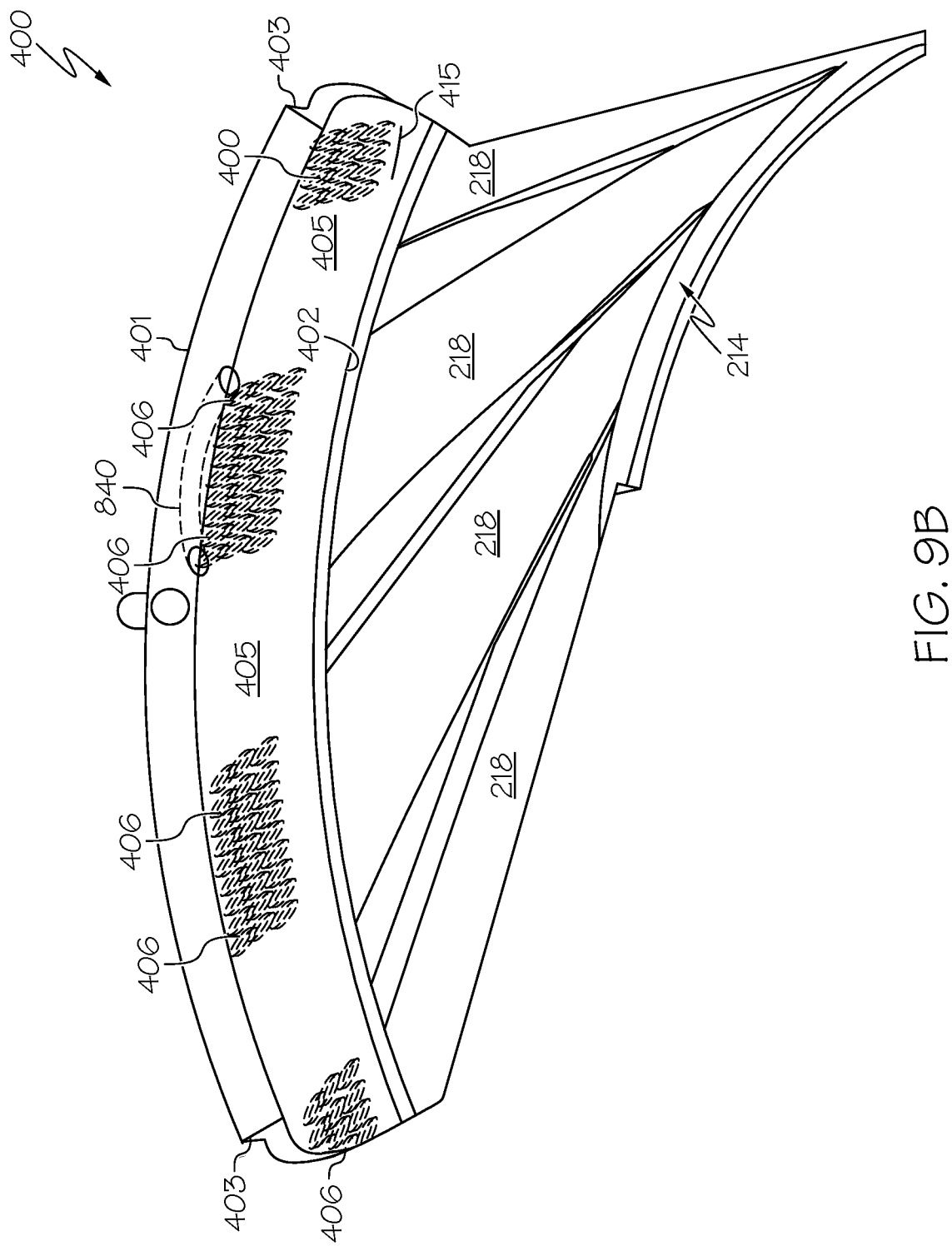

The scavenge plenum 405, connected with the plurality of holes 406, may include an inner radial wall 402, and outer radial wall 401, and an axial end wall 403 positioned at an aft-most (downstream) end of the scavenge plenum 405. The inner radial wall 402 and out the outer radial wall 401 may be contoured or curved to match the curvature of the arc 233, such that each of the plurality of holes 406 extends about the same distance between the deswirl assembly flowpath 228 and the scavenge plenum 405. The scavenge plenum 405 may further include a slot 415 for returning air back to the flowpath 228. The scavenge plenum 405 may be implemented with any of the foregoing-described scavenge methodologies. For example, as shown in FIGS. 6A-B, the scavenge plenum 405 may employ any of a port 810A-C coupled with a smart purge valve 811; as shown in FIGS. 7A-B, the scavenge plenum 405 may employ a scroll configuration 820 with outlet 821 coupled with the smart purge valve 811; as shown in FIGS. 8A-B, the scavenge plenum 405 may employ a filter 830; and, as shown in FIGS. 9A-B, the scavenge plenum 405 may employ a bypass circuit 840 with filter (the details of these various scavenging methodologies is not duplicated for the description of scavenging means 400 for purposes of brevity; the reader may refer to the description of scavenging means 300 therefor).

In operation, accordingly, the compressed air that exits the diffuser 204 at diffuser outlet 216 will enter the deswirl assembly at inlet 230. Any small particles in the compressed air, as it passes through the deswirl flowpath 228, will tend to track along the arc 233 of outer annular wall 222. As the particles pass along the outer annular wall 222 along the arc 233, the small particles will be extracted from the flowpath 228 through the plurality of holes 406, and enter into the scavenge plenum 405. Air returns via slot 415. In this manner, the small particles are efficiently prevented from entering the combustor section 124, which is positioned axially downstream from the second plurality of vanes 226 and deswirl assembly outlet 232. Any small particle accumulation in the scavenge plenum 305 may be removed from time to time by an using any of the foregoing-described scavenge methodologies: Namely, the scavenge methodology employed with the plenum 305 may be any of a port 810A-C coupled with a smart purge valve 811, a scroll configuration 820 with outlet 821 coupled with the smart purge valve 811, a filter 830, or a bypass circuit 840 with filter. In the illustrated embodiment, the bypass circuit 840 FIGS. 9A-B is shown in the axial wall end 403. In other embodiments, the bypass circuit 840 may be located in the outer radial wall 401.

Figure 10:
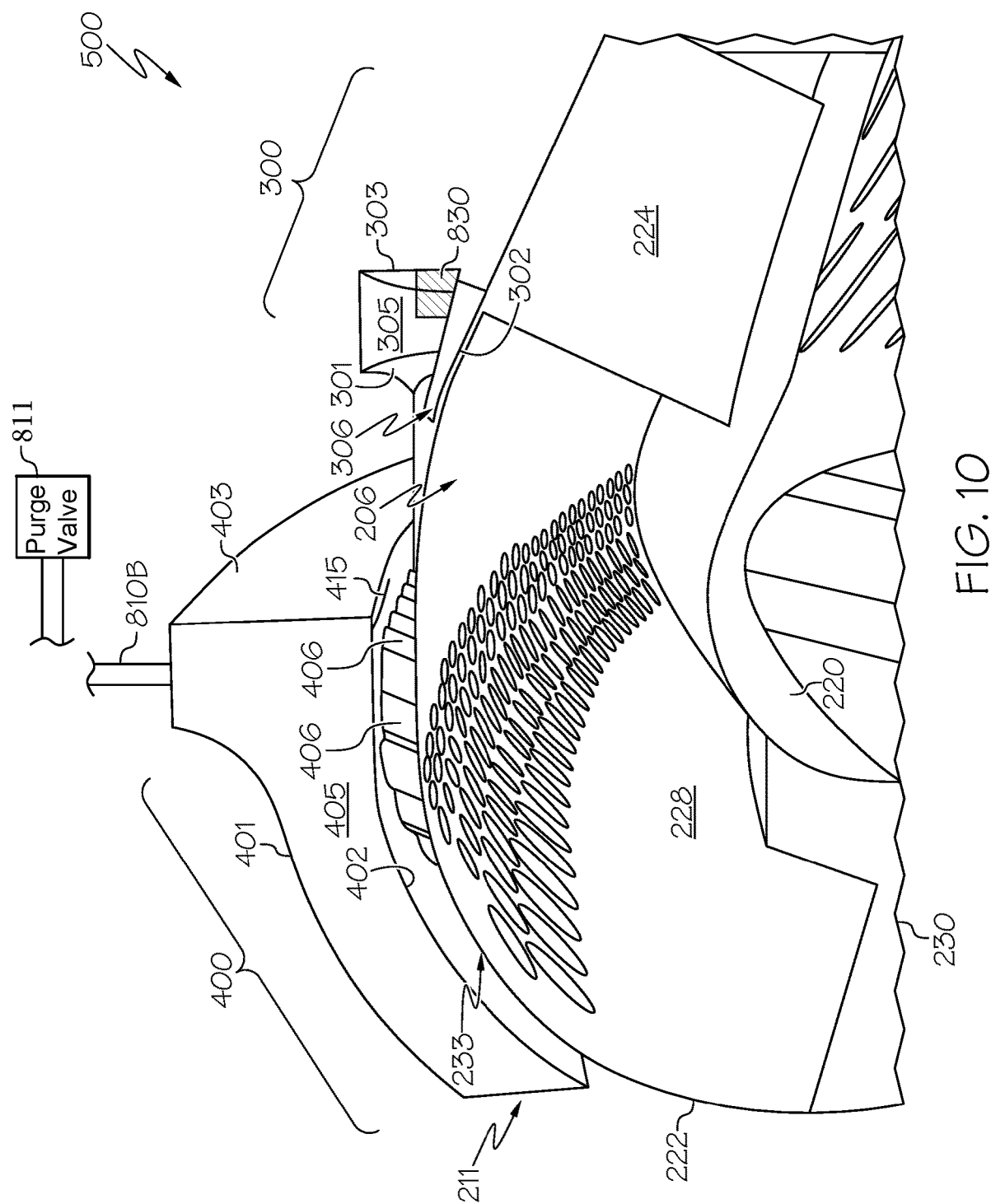
FIG. 10 is cross section view of third, hybrid small particle separation means incorporating aspects of both the first and second small particle separation means.

With reference now to the third small particle separation means 500, as detailed in FIG. 10, a combination or "hybrid" of the separation means 300 and the separation means 400 may be implemented. In this embodiment, an extraction slot 306 is provided in the outer annular wall that leads to a scavenge plenum 305. The extraction slot 306 is located along the deswirl flowpath 228 at a position downstream of the arc 233, yet prior to the plurality of vanes 224, 226. The scavenge plenum 305 is located radially outward from the deswirl assembly 206 at a position that is radially adjacent to the first (upstream) plurality of vanes 224. Additionally, the deswirl assembly outer annular wall 222 is fitted with a plurality of holes 406 along the arc 233. The holes extend through the outer annular wall 222 and the shroud 211 and open into a scavenge plenum 405, the scavenge plenum 405 being positioned radially outward from and adjacent to the deswirl assembly 206 along the arc 233. In operation, as the particles pass along the outer annular wall 222 along the arc 233, the small particles will be extracted from the flowpath 228 through the plurality of holes 406, and enter into the scavenge plenum 405. Additionally, any small particles that miss the holes 406 will be extracted from the flowpath 228 at the extraction slot 306 located along the outer annular wall 222, and enter into the scavenge plenum 305. Any small particle accumulation in the scavenge plenum 305 may be removed from time to time by an using any of the foregoing-described scavenge methodologies: Namely, the scavenge methodology employed with the plenum 305 may be any of a port 810A-C coupled with a smart purge valve 811, a scroll configuration 820 with outlet 821 coupled with the smart purge valve 811, a filter 830, or a bypass circuit 840 with filter. Just by way of non-limiting, illustrative example, FIG. 10 is illustrated with a filter 830 in the plenum 305, and a radial port 810B with purge valve 811 for the plenum 405.

Figure 11:
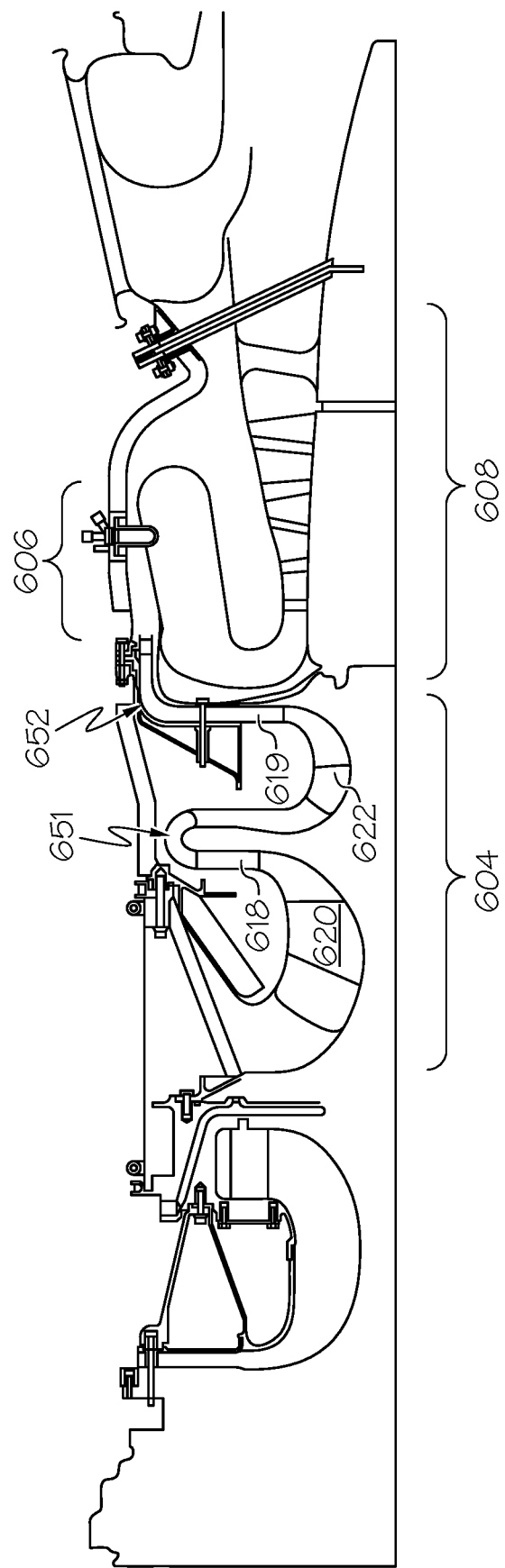
FIG. 11 is a simplified cross section side view of an exemplary APU gas turbine engine including two compressor section according to an embodiment of the present disclosure.

The previously-described embodiments have been set forth in connection with a radial compressor that is located immediate upstream of the combustor section, and including a diffuser and a deswirl assembly. However, other locations in a turbine engine are also possible. More broadly, as initially noted above, the small particle separation means of the present disclosure (300, 400, 500) along with any of the various scavenge methodologies may be generally positioned anywhere in the air flowpath where there is an abrupt change in flow from the radial direction to the axial direction. For example, FIG. 11 illustrates portions of an APU including a compression section 604 including a first and a second radial compressor 620, 622, a combustor section 606, and a turbine section 608. As illustrated, subsequent to the diffuser 618 connected with the first radial compressor 620 is located a bending or arcuate section 651, wherein the air flow changes abruptly from radial to axial. Section 651 would be another suitable location to place the small particle separation means of the present disclosure 300, 400, 500, along with any of the various scavenge methodologies. Also shown, downstream of the first compressor is the second radial compressor 622, and its associated diffuser 619, subsequent to which is another arcuate section 652, which as shown in previous Figures is a suitable location to place the small particle separation means of the present disclosure 300, 400, 500, along with any of the various scavenge methodologies. As such, the present disclosure should not be thought of as limited with regard to the placement of the small particle separation means to any particular radial compressor stage.

Figure 12:
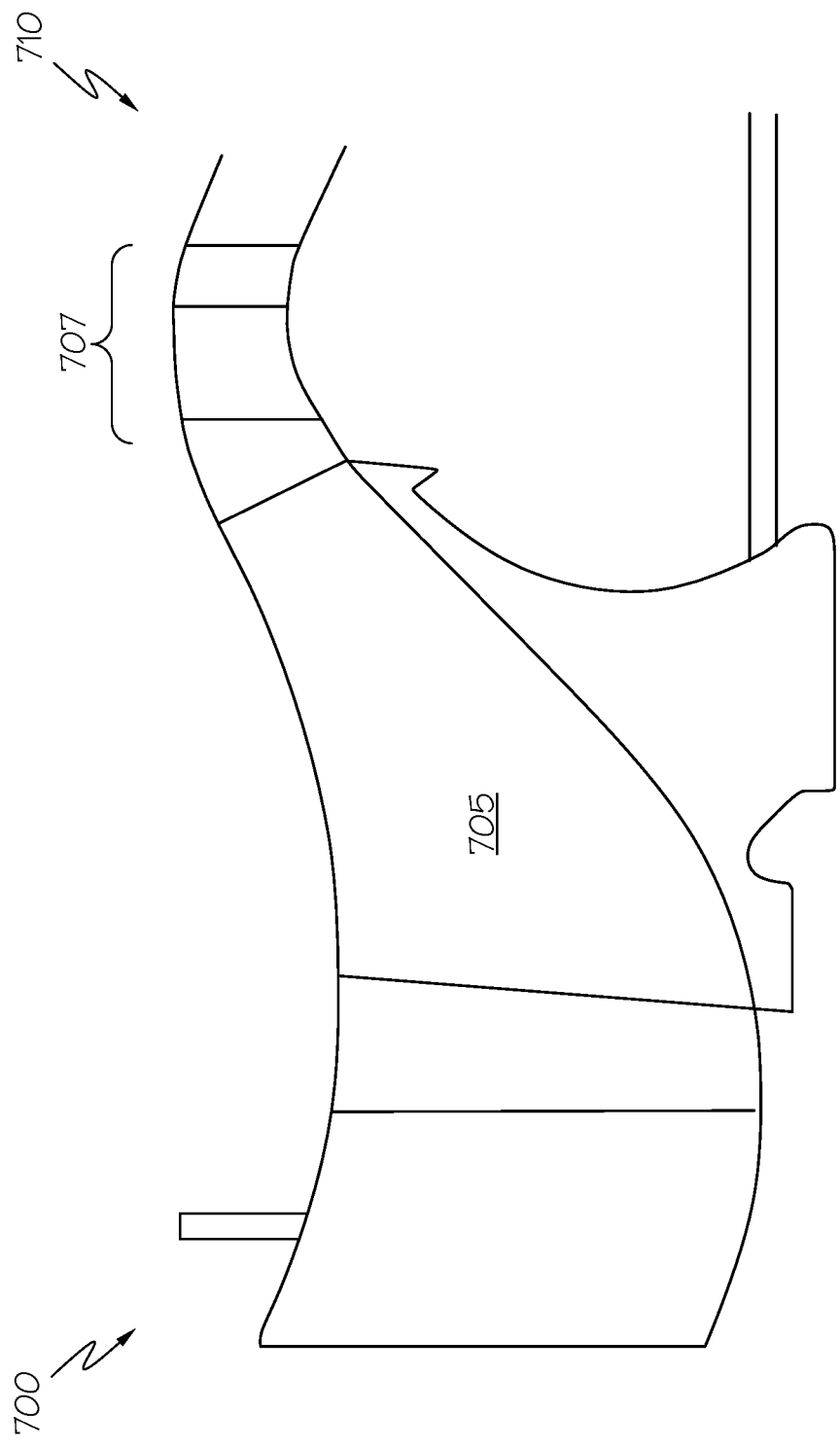
FIG. 12 is a simplified cross section side view of an exemplary gas turbine engine employing a mixed flow compressor, as opposed to a centrifugal compressor, in accordance with a further embodiment of the present disclosure.

As a further illustration of the concept that the small particle separation means may be located in any gas turbine engine compressor section (not just radial/centrifugal compressor sections) where there is an abrupt change from a substantially radial flow to a substantially axial flow, FIG. 12 illustrates a gas turbine engine 700 employing a mixed-flow compressor 705, and a stator vane assembly 707 located downstream therefrom. As illustrated, a flow change from the radial direction to the axial direction occurs as compressed air passes from the compressor 705 to the stator vane assembly 707 and there-onward. Thus, as illustrated, at location 710 downstream from the stator vane assembly 707, any of the above-described small particle separation means 300, 400, 500 may be implemented, along with any of the various scavenge methodologies.

In accordance with any of the disclosed embodiments, with zero bleed flow out of the scavenge plenum, it has been determined that greater than about 50%, such as greater than about 75%, for example greater than about 90% of the above-described small particles (e.g., <=about 20 microns in greatest cross-sectional length) by mass can be removed from the flowpath 228 into a scavenge plenum 305 and/or 405. Moreover, it has further been determined that once in a scavenge plenum, greater than about 50%, such as greater than about 75%, for example greater than about 90% of the above-described small particles by mass remain within the plenum (305/405) during normal engine operation, and therefore may be removed at the above-described purge/cleaning intervals. These methodologies therefore provide efficient small particle extraction without scavenge/bleed flow that would cause undesirable turbine engine performance degradation.

Accordingly, the present disclosure has provided various embodiments of small particle separation means with various scavenge methodologies for use in gas turbine engines, such as propulsion-type engines and APUs. The disclosed scavenge methodologies exhibit improved particle separation efficiency, particularly with regard to small sand particles. As noted above, these scavenge methodologies may be implemented in addition to or as an alternative to conventional inlet particle separators, and may be located at positions within the engine that are different as compared to conventional inlet particle separators, for example in a compressor section (radial, mixed-flow) anywhere there is an abrupt change in flowpath from the radial direction to the axial direction.

While at least one exemplary embodiment has been presented in the foregoing detailed description of the invention, it should be appreciated that a vast number of variations exist. It should also be appreciated that the exemplary embodiment or exemplary embodiments are only examples, and are not intended to limit the scope, applicability, or configuration of the invention in any way. Rather, the foregoing detailed description will provide those skilled in the art with a convenient road map for implementing an exemplary embodiment of the invention. It being understood that various changes may be made in the function and arrangement of elements described in an exemplary embodiment without departing from the scope of the invention as set forth in the appended claims.

What is claimed is:

1. A method for scavenging small particles from a turbine engine, the method comprising the steps of:
    compressing air in a compressor that rotates about a longitudinal axis to generate compressed air, wherein the compressed air that exits the compressor includes at least a tangential flow component and a radial flow component, and wherein the compressed air comprises a plurality of small particles;
    directing the compressed air through a flowpath defined as an arc between a diffuser and a deswirl assembly downstream of the compressor and upstream of a combustor, the flowpath causing a reduction in the radial flow component of the compressed air and the introduction of or an increase in an axial flow component of the compressed air, the flowpath defined between an inner annular wall and an outer annular wall;
    removing a portion of the compressed air from the flowpath and directing the portion of the compressed air into a scavenge plenum through a plurality of holes defined through the outer annular wall of the flowpath and through an inner radial wall of a shroud of the scavenge plenum, the plurality of holes located at a radial apex of the arc that defines the flowpath, the plurality of holes arranged into groups that are spaced apart about a circumference of the outer annular wall, each group of the groups comprising a respective subset of the plurality of holes arranged in circumferential rows that are staggered, the shroud of the scavenge plenum being positioned adjacent to and radially outward from the flowpath; and
    removing the plurality of small particles from the scavenge plenum intermittently by withdrawing the plurality of small particles through an outlet of the scavenge plenum either during engine operation, during engine shutdown, or while the turbine engine is not in operation, but not continuously during engine operation.

2. The method of claim 1, wherein the compressor is a centrifugal compressor or a mixed-flow compressor.

3. The method of claim 1, wherein the outlet is coupled with a valve.

4. The method of claim 3, wherein the outlet-coupled valve is a purge valve.

5. The method of claim 1, further comprising directing a second portion of the compressed air into a second scavenge plenum through an extraction slot at the annular outer wall of the flowpath, radially inward and downstream from the radial apex of the annular outer wall of the flowpath.

6. The method of claim 5, wherein the extraction slot comprises a continuous circumferential slot, a discontinuous circumferential slot, or a series of circumferentially-disposed holes/apertures of any shape or count.

7. The method of claim 1, wherein the plurality of holes are angled circumferentially at 25 to 65 degrees and axially at 5 to 20 degrees.

8. The method of claim 1, further comprising directing a second portion of the compressed air into a second scavenge plenum through an extraction slot at the annular outer wall of the flowpath, radially inward and downstream from the radial apex of the annular outer wall of the flowpath.

9. The method of claim 1, wherein the plurality of small particles are less than or equal to 20 microns in greatest cross-sectional length.

10. The method of claim 1, wherein the turbine engine includes a second compressor, and wherein the method is performed on the compressed air that exits the compressor and again on a compressed air that exits the second compressor.

11. The method of claim 1, wherein the turbine engine is embodied as a propulsion-type turbine engine or as an auxiliary power unit (APU).

12. The method of claim 1, wherein the turbine engine is implemented on an aircraft, a land vehicle, or a watercraft.

13. The method of claim 1, wherein the scavenge plenum includes a slot.

* * * * *